US012655235B2

(12) United States Patent　　　(10) Patent No.:　US 12,655,235 B2
Guy et al.　　　　　　　　　　　　(45) Date of Patent:　　Jun. 16, 2026

(54) PROCESSES FOR VENTING OLEFIN POLYMERIZATION SYSTEMS

(71) Applicant: ExxonMobil Chemical Patents Inc., Baytown, TX (US)

(72) Inventors: Nathaniel B. Guy, Sewickely, PA (US); Stacy N. Olaleye, Houston, TX (US); Michael D. Lucas, Houston, TX (US); Handel D. Bennett, Houston, TX (US); David T. Lakin, Houston, TX (US); Benjamin J. Ohran, Humble, TX (US); Aaron C. Mcginnis, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 492 days.

(21) Appl. No.: 18/264,515

(22) PCT Filed: Feb. 25, 2022

(86) PCT No.: PCT/US2022/070841
§ 371 (c)(1),
(2) Date: Aug. 7, 2023

(87) PCT Pub. No.: WO2022/187791
PCT Pub. Date: Sep. 9, 2022

(65) Prior Publication Data
US 2024/0043581 A1　　Feb. 8, 2024

Related U.S. Application Data

(60) Provisional application No. 63/157,392, filed on Mar. 5, 2021.

(51) Int. Cl.
*C08F 2/01*　　　　(2006.01)
*B01J 8/00*　　　　(2006.01)
(Continued)

(52) U.S. Cl.
CPC ............... *C08F 10/02* (2013.01); *B01J 8/007* (2013.01); *B01J 8/1809* (2013.01); *B01J 8/1827* (2013.01);
(Continued)

(58) Field of Classification Search
None
See application file for complete search history.

(56) References Cited

U.S. PATENT DOCUMENTS

| | | | |
|---|---|---|---|
| 4,003,712 A | 1/1977 | Miller | |
| 4,011,382 A | 3/1977 | Levine et al. | |

(Continued)

FOREIGN PATENT DOCUMENTS

EP　　　　0571826 B1　　2/1997

*Primary Examiner* — Richard A. Huhn
(74) *Attorney, Agent, or Firm* — C. Tumey Law Group PLLC

(57) ABSTRACT

A process for producing an olefin polymer employs a gas phase polymerization reactor in fluid communication with a vent column and a product discharge system. The discharge system can include first and second pairs of lock hoppers, where each pair includes an upstream lock hopper connected by a valve to the reactor and a downstream lock hopper connected by a valve to the upstream lock hopper and by a further valve to a product recovery system, and where a first cross-tie can be provided between the upstream lock hoppers of the first and second pairs of lock hoppers and a second cross-tie can be provided between the downstream lock hoppers of the first and second pairs of lock hoppers. Upon reaching the vent column's maximum removal capacity, additional gas can be removed from the reactor by reducing the frequency of opening the second cross-tie between the downstream lock hoppers.

20 Claims, 19 Drawing Sheets

(51) Int. Cl.

| | |
|---|---|
| *B01J 8/18* | (2006.01) |
| *C08F 6/00* | (2006.01) |
| *C08F 10/02* | (2006.01) |

(52) U.S. Cl.

CPC .............. *B01J 8/1872* (2013.01); *C08F 2/01* (2013.01); *C08F 6/001* (2013.01); *B01J 2208/00761* (2013.01); *B01J 2208/00769* (2013.01); *B01J 2219/00162* (2013.01); *B01J 2219/00164* (2013.01); *C08F 2400/02* (2013.01)

(56) References Cited

U.S. PATENT DOCUMENTS

| | | | |
|---|---|---|---|
| 4,086,408 A | 4/1978 | Karol et al. | |
| 4,303,771 A | 12/1981 | Wagner et al. | |
| 4,349,648 A | 9/1982 | Jorgensen et al. | |
| 4,588,790 A | 5/1986 | Jenkins, III et al. | |
| 4,621,952 A | 11/1986 | Aronson | |
| 5,306,792 A | 4/1994 | Havas et al. | |
| 5,352,749 A | 10/1994 | DeChellis et al. | |
| 6,063,877 A | 5/2000 | Kocian et al. | |
| 6,255,411 B1 | 7/2001 | Hartley et al. | |
| 6,818,187 B2 | 11/2004 | Govoni et al. | |
| 6,927,260 B2 | 8/2005 | Berhalter et al. | |
| 8,129,485 B2 | 3/2012 | Force et al. | |
| 8,293,853 B2 | 10/2012 | Parrish et al. | |
| 9,328,177 B2 | 5/2016 | Moebus et al. | |
| 9,410,001 B2 | 8/2016 | Cai et al. | |
| 2001/0034422 A1* | 10/2001 | Hartley .................. | B01J 8/1809 526/71 |
| 2005/0137364 A1 | 6/2005 | Cai et al. | |
| 2010/0092252 A1 | 4/2010 | Force et al. | |
| 2010/0143050 A1 | 6/2010 | Force et al. | |
| 2020/0406213 A1 | 12/2020 | Drabish et al. | |
| 2021/0077970 A1* | 3/2021 | Begue .................. | B01J 19/0053 |
| 2021/0079126 A1* | 3/2021 | Lucas ..................... | B01J 4/001 |

* cited by examiner

Convey Gas and Reactor Gas Flow through PDS With W and X

PROCESSES FOR VENTING OLEFIN POLYMERIZATION SYSTEMS

CROSS-REFERENCE OF RELATED APPLICATIONS

This application is a National Phase Application claiming priority to PCT Application Serial No. PCT/US2022/070841, filed Feb. 25, 2022, which claims the benefit of U.S. Provisional Application 63/157,392 filed Mar. 5, 2021 entitled "Processes For Venting Olefin Polymerization Systems", the entireties of which are incorporated by reference herein.

FIELD

This application relates to olefin polymerization processes. In particular, this disclosure relates to processes for venting gas phase olefin polymerization systems.

BACKGROUND

Gas phase catalytic polymerization of olefins is the predominant technology used to produce polyolefin resins. The catalysts used in the process are contained in solid substrate particles from which the polymer chains grow. Gas phase olefin polymerization technology often employs a fluidized bed, where the particles are fluidized by a gas stream also containing the reactants, such as the olefin monomer or monomers. The carrier gas for the catalyst particles is normally an inert gas such as nitrogen. Processes of this type are described in, for example, EP0475603A1; EP0089691A2; and EP0571826A3.

In many gas phase polymerization processes, the polymer particles produced in the fluidized bed are discharged discontinuously from the reactor and conveyed pneumatically, generally using nitrogen, to a product recovery system. The product recovery system typically includes one or more pairs of series connected lock hoppers to control gas loss from the reactor during discharge of the polymer. An early example of such a product recovery system using a single pair of lock hoppers in disclosed in, for example, U.S. Pat. No. 4,621,952. More recent configurations employ two pairs of lock hoppers in which a valved connection is provided between the corresponding lock hopper in each pair as an optional step to reduce gas loss by minimizing the pressure of the discharging pair of lock hoppers. There are two such valved connections, one of which connects the upstream and hence higher pressure lock hoppers and is referred to herein as the W cross-tie, while the other connects the downstream and lower pressure lock hoppers and is referred to herein as the X cross-tie. An example of such an improved product recovery system is disclosed in U.S. Pat. No. 6,255,411.

Pressure control is a vital factor in any gas phase olefin polymerization system and is dominated by the need to remove nitrogen. This can be achieved by direct venting of nitrogen from the reactor, but without separation facilities to recover the hydrocarbons entrained in the vent gas, doing so is not economically attractive and poses potential environmental problems. In addition, hydrocarbon recovery is difficult and expensive, so it is important to minimize the removal of nitrogen by direct reactor venting. Another mechanism for removing nitrogen from a gas phase olefin polymerization system is via the product recovery system described above, since in effect the gas lost when polymer product is removed from the reactor constitutes an implicit nitrogen vent.

Improving pressure control while reducing the costs and hydrocarbon losses inherent in direct venting remains a strong driver of polymerization research and development.

Further references of potential interest in this general regard include U.S. Pat. Nos. 4,003,712, 4,011,382, 4,086,408, 4,303,771, 4,349,648, 5,352,749, 6,063,877, 6,818,187, 6,927,260, 8,129,485, 8,293,853, and 9,328,177; as well as U.S. Patent Application Publication No. 2005/0137364A1, and PCT Patent Application Publication Nos. 2014/074981 and 2018/063765 8,293,853.

SUMMARY

Processes for venting gas phase olefin polymerization systems are provided. In some embodiments, the process can include providing a gas phase polymerization system that can include a reactor, a reactor recycle loop in fluid communication with an outlet and an inlet of the reactor, a flare in fluid communication with the reactor recycle loop, a vent column in fluid communication with the reactor recycle loop and the flare, a product discharge system that can include first and second pairs of lock hoppers and a product purge bin, and a gas vent line in fluid communication with the reactor and the product purge bin. Each pair of lock hoppers can include an upstream lock hopper connected by a valve to the reactor and a downstream lock hopper connected by a valve to the upstream lock hopper and connected by a valve to the product purge bin. A first cross-tie can be provided between the upstream lock hoppers of the first and second pairs of lock hoppers and a second cross-tie can be provided between the downstream lock hoppers of the first and second pairs of lock hoppers. The first and second cross-ties each can include a valve configured to selectively allow and to selectively prevent fluid communication between the upstream lock hoppers and the downstream lock hoppers, respectively. An olefin monomer, a carrier gas, and a particulate catalyst can be supplied to the reactor under conditions effective to maintain the particulate catalyst in a fluidized state and to polymerize the olefin monomer in the presence of the particulate catalyst to produce a polymer product. A reactor overhead that can include a reactor gas from the outlet of the reactor can be supplied to the reactor recycle loop. The reactor gas can include unreacted olefin monomer and carrier gas. A first portion of the reactor overhead in the reactor recycle loop can be supplied to the vent column. The first portion of the reactor overhead can be contacted with a stripping medium within the vent column to remove at least a portion of the olefin monomer to produce a vent column overhead rich in the carrier gas and lean in the olefin monomer and a vent column bottoms rich in the olefin monomer and lean in the carrier gas. The vent column overhead can be supplied to the flare. A second portion of the reactor overhead in the reactor recycle loop and the vent column bottoms can be supplied to the reactor. The polymer product and an additional quantity of reactor gas can be removed from the reactor through the first and second pairs of lock hoppers in removal cycles. Each removal cycle can include the steps of: (1) transferring polymer product and reactor gas from the reactor to (1a) the upstream lock hopper of the first pair of lock hoppers and equilibrating the pressure therebetween or (1b) the upstream lock hopper of the second pair of lock hoppers and equilibrating the pressure therebetween; (2) while performing step (1), transferring polymer product and reactor gas from (2a) the upstream lock hopper to the downstream lock hopper of the second pair of lock hoppers and equilibrating the pressure therebetween or (2b) the upstream lock hopper to the downstream lock hopper of the first pair of lock hoppers and equilibrating the pressure therebetween; (3) while performing steps (1) and (2), transferring polymer product using a conveying gas from (3a) the downstream lock hopper of the first pair of lock hoppers to the product purge bin or (3b) the downstream lock hopper of the second pair of lock hoppers to the product purge bin; (4) after performing steps (1), (2), and (3), passing reactor gas from (4a) the upstream lock hopper of the first pair of lock hoppers to the upstream lock hopper of the second pair of lock hoppers via the first cross-tie to equilibrate the pressure therebetween or (4b) the upstream lock hopper of the second pair of lock hoppers to the upstream lock hopper of the first pair of lock hoppers via the first cross-tie to equilibrate the pressure therebetween; and further where some or all of the removal cycles further include the step of: (5) after performing steps (1), (2), and (3), passing reactor gas from (5a) the downstream lock hopper of the first pair of lock hoppers to the downstream lock hopper of the second pair of lock hoppers via the second cross-tie to equilibrate the pressure therebetween or (5b) the downstream lock hopper of the second pair of lock hoppers to the downstream lock hopper of the first pair of lock hoppers via the second cross-tie to equilibrate the pressure therebetween. Steps (1a), (2a), (3a), (4a), and (5a) or steps (1b), (2b), (3b), (4b), and (5b), respectively, can be carried out in sequential order and in alternating removal cycles with respect to one another. The process can also include determining an additional quantity of carrier gas needs to be removed from the gas phase polymerization system. An amount of the first portion of the reactor overhead in the reactor recycle loop supplied to the vent column can be increased until a maximum removal capacity of the vent column is reached. The frequency of step (5) can be reduced such that after performing steps (1), (2), and (3), the reactor gas is passed from one of the downstream lock hoppers to the other downstream lock hopper via the second cross-tie in some, but not all, of the removal cycles.

BRIEF DESCRIPTION OF THE DRAWINGS s FIG. 1 depicts a simplified flow diagram of a gas phase olefin polymerization system, according to one or more embodiments described.

DETAILED DESCRIPTION OF THE EMBODIMENTS

Figure 1:
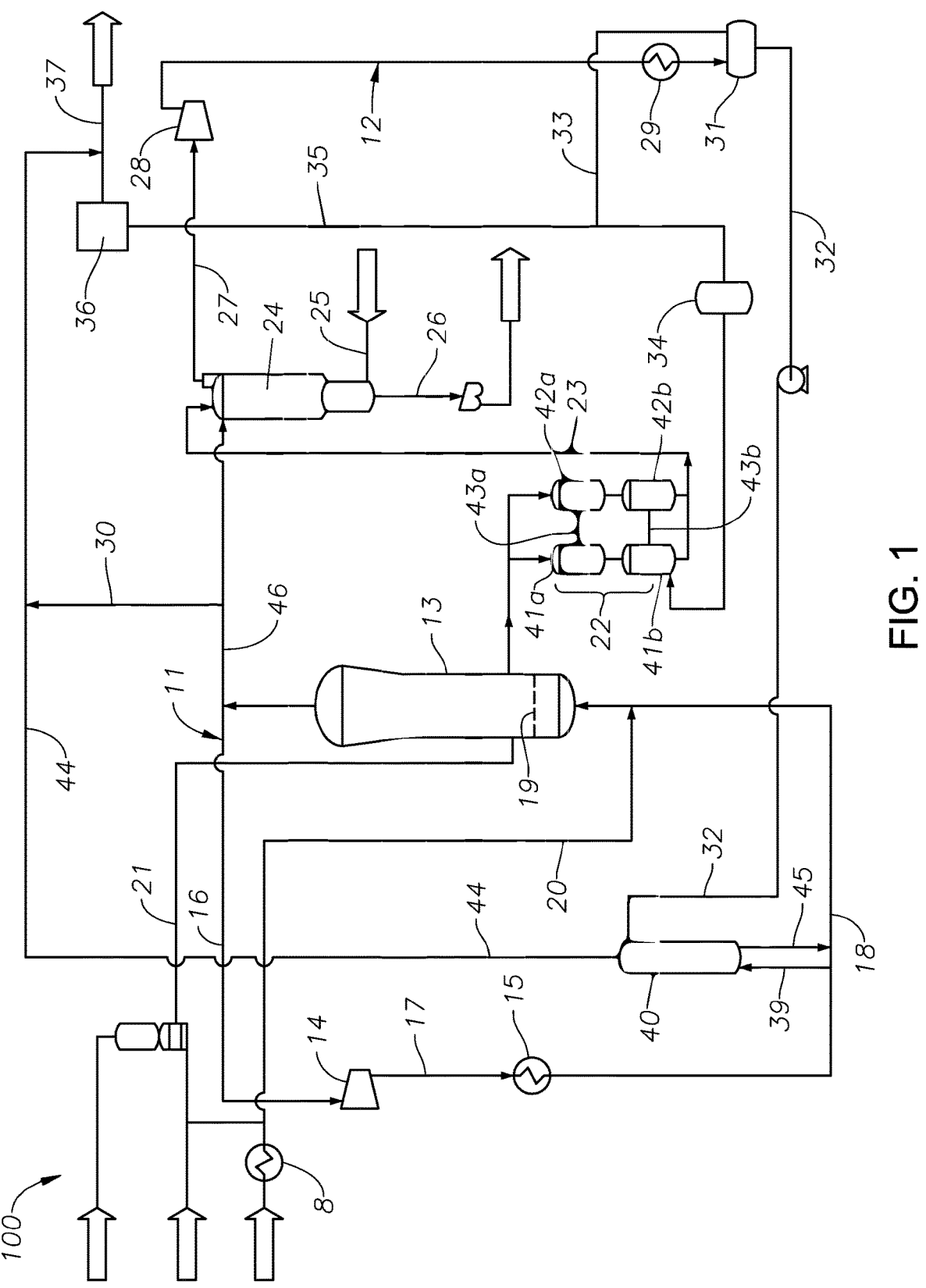

FIG. 1 depicts a simplified flow diagram of a gas phase olefin polymerization system 100, according to one or more embodiments. The gas phase olefin polymerization system 100 can include a polymer production loop 11 and a polymer recovery loop 12. Connected in series within the polymer production loop 11 can be a fluidized bed reactor 13, a cycle gas compressor 14, and a cycle gas cooler 15. The outlet from the reactor 13 can be connected by line 16 to the low pressure side of the compressor 14 and the high pressure side of the compressor 14 can be connected via line 17 to the high temperature side of the cooler 15. The low temperature side of the cooler 15 can be connected via line 18 to the inlet of the reactor 13. The reactor inlet is generally at the bottom of the reactor below a distributor plate 19.

A first inlet of a vent column 40 can be connected via line 39 to line 18 and can be configured to introduce a first portion of a reactor overhead from line 18 into the vent column A second inlet of the vent column 40 can be in fluid communication with line 32, which can be configured to convey a stripping medium, e.g., condensed liquids from condensed liquids drum 31, into the vent column 40. The stripping medium introduced via line 32 into the vent column 40 can contact the reactor overhead, which can be rich in ethylene and, if present, other monomers introduced via line 39 to produce (1) a vent column overhead lean in ethylene and, if present, other monomers and (2) a vent column bottoms that can be rich in ethylene and, if present, other monomers. The term "rich" when used in phrases such as "X-rich" or "rich in X" means, with respect to an outgoing stream obtained from a device, that the stream includes material X at a concentration higher than in the feed material fed to the same device from which the stream is derived. The term "lean" when used in phrases such as "X-lean" or "lean in X" means, with respect to an outgoing stream obtained from a device, that the stream comprises material X at a concentration lower than in the feed material fed to the same device from which the stream is derived. An overhead outlet of the vent column 40 can be in fluid communication via line 44 with an exhaust line 37 that can send the vent column overhead to a flare (not shown). A bottoms outlet of the vent column 40 via line 45 can be in fluid communication with line 18 for returning the vent column bottoms rich in ethylene and, if present, other monomers to the reactor 13.

Fresh ethylene from a pipeline or storage, optionally after heating by a heat exchanger, can be supplied via line 20 to be mixed with cooled recycled ethylene and, if present, other monomers in line 18 before being introduced into the reactor 13, generally near the bottom of the reactor 13 below (shown) and/or above (not shown) a distributor plate 19. One or more $C_3$ to $C_6$ alkanes can also be supplied to the reactor 13 via lines 20 and 18 to assist in heat removal and hydrogen to control the degree of polymerization. One or more comonomers, such as propylene and/or $C_4$ to $C_8$ alpha-olefins, can also be supplied to the reactor 13 via line 20. A carrier gas for the polymerization catalyst and for fluidizing the growing polymer particles in the reactor can be mixed with fresh catalyst from storage and supplied to the reactor 13 via line 21. The reactor 13 can be operated under conditions to maintain the monomer(s) in the gas phase and effective to polymerize the monomer(s) to produce an ethylene homopolymer or copolymer. Typical conditions include a temperature of to 110° C. and a pressure of 1,500 kPa-absolute to 3,000 kPa-absolute, such as 1,700 kPa-absolute to 2,600 kPa-absolute.

The polymer product contains unreacted monomer(s) as well as other hydrocarbons added to, or produced in, the polymerization process as the product leaves the reactor 13. The polymer product can be discharged from the reactor 13 along with a reactor gas. "Reactor gas" as used herein refers to the gas that leaves the reactor, and typically is a mixture that can include ethylene (e.g., unreacted ethylene gas leaving the reactor) and at least a portion of the carrier gas used to fluidize the catalyst and transport it into the reactor in the first place. The carrier gas is preferably nitrogen, though it can be any gas that would not react with the catalyst nor alter the polymerization reaction. Carrier gases for gas phase fluidized bed polymerization reactors are well known in the art, and their identity is not the focus of the present disclosure. The reactor gas may further include hydrogen (used, e.g., as a chain transfer agent in polymerization) as well as reaction and other process byproducts such as water, ammonia, methane, higher alkanes, carbon dioxide, and/or other compounds of oxygen, carbon, and/or hydrogen.

Particulate polymer product can be removed intermittently from the reactor 13 typically from a region just above the distributor plate 19 and passed to a product discharge system 22 in FIG. 1. The product discharge system 22 can include first and second pairs of lock hoppers 41(*a*)/41(*b*) and 42(*a*)/42(*b*), respectively, a monomer stripping vessel or product purge bin 24, and a gas vent line 46 in fluid communication with the reactor 13 and the product purge bin 24. The first pair of lock hoppers 41(*a*) and 41(*b*) and the second pair of lock hoppers 42(*a*) and 42(*b*) can be connected in parallel between the reactor 13 and line 23. In addition, a first cross-tie 43(*a*) a can be provided between the upstream lock hoppers 41(*a*) and 42(*a*) and a second cross-tie 43(*b*) can be provided between the downstream lock hoppers 41(*b*), 42(*b*). The first cross-tie 43(*a*) can also be referred to as the "W cross-tie" and the second cross-tie 43(*b*) can also be referred to as the "X cross-tie".

Figure 2:
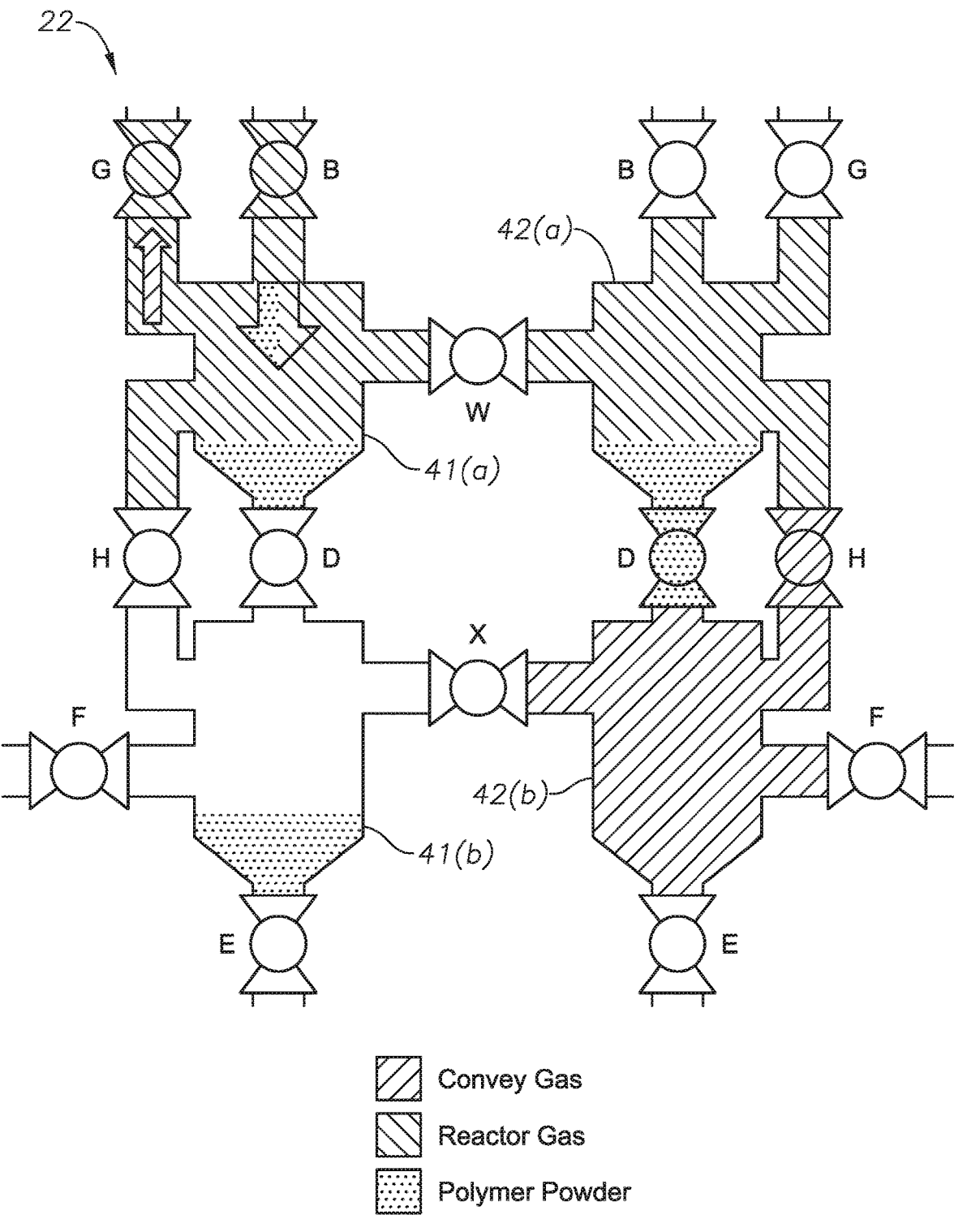
FIG. 2 depicts a schematic representation of a product delivery system for use in the system of FIG. 1, according to one or more embodiments described.

FIG. 2 depicts a schematic representation of a product discharge system 22 for use in the system of FIG. 1, according to one or more embodiments. Referring to FIG. 1 and FIG. 2, the upstream lock hoppers 41(*a*), 42(*a*) can be connected by valves B and G to the reactor 13 and can be connected by valves D and H to the downstream lock hopper 41(*b*), 42(*b*). The downstream lock hoppers 41(*b*), 42(*b*), can each be connected by a valve E to line 23 and the product recovery loop 12. Each downstream lock hopper 41(*b*), 42(*b*) can also be connected by a valve F to a source of conveying gas to facilitate transfer of polymer product from the downstream lock hopper 41(*b*), 42(*b*) into line 23. In addition, a first or W valve can be provided in the first or W cross-tie 43(*a*) between the upstream lock hoppers 41(*a*) and 42(*a*) and a second or X valve can be provided in the second or X cross-tie 43(*b*) between the downstream lock hoppers 41(*b*) and 42(*b*).

Since the monomer stripping vessel 24 operates at a significantly lower pressure, normally sub-atmospheric pressure, than the reactor 13, the construction and operation of the product discharge system 22 can be designed not only to provide efficient removal of the solid polymer product but also to allow reduction in effluent pressure without excessive loss of the reactor contents. Thus, to initiate a product discharge cycle, one of the valves B can be opened that connects the reactor 13 with the upstream lock hopper 41(*a*), with the other valves connected to the hopper 41(*a*) being closed to isolate it from the remainder of the product discharge system 22. When the valve B is opened, polymer product and reactor gas flow into the lock hopper 41(*a*) (as illustrated by the arrow in FIG. 2) and, as the lock hopper 41(*a*) approaches a desired fill level, the associated valve G can be opened to allow the pressure in the lock hopper 41(*a*) to equilibrate with that of the reactor 13 and thereby facilitate filling of lock hopper 41(*a*). When lock hopper 41(*a*) is filled to a desired level, valves B and G can be closed and the valve D connecting lock hoppers 41(*a*) and 41(*b*) can be opened to allow the contents of lock hopper 41(*a*) to be transferred to lock hopper 41(*b*). Again, during this operation, the hopper 41(*b*) can be isolated from the remainder of the product discharge system 22 (e.g., with valves X, E, F, and H remaining closed), at least until the hopper 41(*b*) approaches being filled to a desired level, at which time valve H can also be opened to allow the pressures in lock hoppers 41(*a*) and 41(*b*) to equilibrate. When lock hopper 41(*b*) is filled to the desired level, valves D and H can be closed, and valves E and F can be opened to allow the conveying gas to transport the polymer product from the lock hopper 41(*b*) to the stripping vessel 24. The whole operation can be similarly carried out for lock hoppers 42(*a*) and 42(*b*).

In general terms, the removal of the polymer product from the reactor 13 through the product discharge system 22 can be effected in sequential removal cycles, where each removal cycle includes the steps of: (1) transferring polymer product and reactor gas from the reactor 13 to (1a) the upstream lock hopper 41(*a*) of the first pair of lock hoppers 41(*a*)/41(*b*) and equilibrating the pressure therebetween or (1b) the upstream lock hopper 42(*a*) of the second pair of lock hoppers 42(*a*)/42(*b*) and equilibrating the pressure therebetween; (2) while performing step (1), transferring polymer product and reactor gas from (2a) the upstream lock hopper 42(*a*) to the downstream lock hopper 42(*b*) of the second pair of lock hoppers 42(*a*)/42(*b*) and equilibrating the pressure therebetween or (2b) the upstream lock hopper 41(*a*) to the downstream lock hopper 41(*b*) of the first pair of lock hoppers 41(*a*)/41(*b*) and equilibrating the pressure therebetween; (3) while performing steps (1) and (2), transferring polymer product using a conveying gas from (3a) the downstream lock hopper 41(*b*) of the first pair of lock hoppers 41(*a*)/41(*b*) to the product purge bin 24 or (3b) the downstream lock hopper 42(*b*) of the second pair of lock hoppers 42(*a*)/42(*b*) to the product purge bin 24; (4) after performing steps (1), (2), and (3), passing reactor gas from (4a) the upstream lock hopper 41(*a*) of the first pair of lock hoppers 41(*a*)/41(*b*) to the upstream lock hopper 42(*a*) of the second pair of lock hoppers 42(*a*)/42(*b*) via the first or W cross-tie 43(*a*) to equilibrate the pressure therebetween or (4b) the upstream lock hopper 42(*b*) of the second pair of lock hoppers 42(*a*)/42(*b*) to the upstream lock hopper 41(*a*) of the first pair of lock hoppers 41(*a*)/41(*b*) via the first or W cross-tie 43(*a*) to equilibrate the pressure therebetween; and further some or all of the removal cycles can further include the step of: (5) after performing steps (1), (2), and (3), passing reactor gas from (5a) the downstream lock hopper 41(*b*) of the first pair of lock hoppers 41(*a*)/41(*b*) to the downstream lock hopper 42(*b*) of the second pair of lock hoppers 42(*a*)/42(*b*) via the second or X cross-tie 43(*b*) to equilibrate the pressure therebetween or (5b) the downstream lock hopper 41(*b*) of the second pair of lock hoppers 42(*a*)/42(*b*) to the downstream lock hopper 41(*a*) of the first pair of lock hoppers 41(*a*)/41(*b*) via the second or X cross-tie 43(*b*) to equilibrate the pressure therebetween. Steps (1a), (2a), (3a), (4a), and (5a) or steps (1b), (2b), (3b), (4b), and (5b), respectively, can be carried out in sequential order and in alternating removal cycles with respect to one another. In some embodiments, during steps (1), (2), (3), (4), and (5), each lock hopper can be isolated by closed valves from any of the reactor 13, the other lock hoppers, and the product discharge system 22 not necessary for the performance of the respective step.

Product withdrawal can be initiated when the product inventory in the reactor 13 exceeds a desired value. The inventory in the reactor 13 can generally be determined by either the bed level or weight measurements, or from secondary measurements used to infer bed level or bed weight. Upon detection of a high reactor inventory, the product discharge system 22 at can be initiated to pass the polymer product from the reactor 13 to the product discharge system 22.

During polymerization the amount of carrier gas, e.g., nitrogen, within the polymerization system 100 can increase to an undesirable level and active steps to remove excess carrier gas from the polymerization system 100 can be initiated. Under ideal conditions, the amount of carrier gas removed as the vent column overhead via line 44 can be sufficient to maintain a desired amount of carrier gas within the polymerization system 100. For a given polymerization system 100, however, the vent column 40 will have a maximum removal capacity. When the maximum removal capacity of the vent column 40 has been reached, the frequency of step (5) can be reduced such that the reactor gas is passed from one of the downstream lock hoppers to the other downstream lock hopper via the X cross-tie 43(*b*) only in some, but not all of the removal cycles.

When it is determined that an additional quantity of the carrier gas needs to be removed from the polymerization system 100, the frequency of step (5) can be further reduced, up to and including until step (5) ceases, such that the valve X remains closed during all removal cycles, and in none of these cycles is reactor gas passed from downstream lock hopper 41(*b*) to the downstream lock hopper 42(*b*). Should it be determined that yet more additional carrier gas needs to be removed from the polymerization system 100, the frequency of step (4) can also be reduced, such that the reactor gas can be passed from one of the upstream lock hoppers to the other upstream lock hopper via the W cross-tie 43(*a*) only in some, but not all, of the removal cycles. Furthermore, where it is determined that a further additional quantity of the carrier gas needs to be removed from the polymerization system 100, the frequency of step (4) can be further reduced until step (4) ceases, such that the valve W remains closed during all removal cycles, and in none of these removal cycles is reactor gas passed from upstream lock hopper 41(*a*) to upstream lock hopper 42(*a*).

Typically, the polymer product and the reactor gas can be transferred from the reactor 13 to (1a) the upstream lock hopper 41(*a*) of the first pair of lock hoppers 41(*a*)/41(*b*) or (1b) the upstream lock hopper 42(*a*) of the second pair of lock hoppers 42(*a*)/42(*b*) for a fixed period of time during each removal cycle. The fixed period of time the polymer product can be transferred from the reactor 13 to one of the upstream lock hoppers can be adjusted. If the vent column 40 has reached its maximum removal capacity and the X cross-tie 43(*b*) and the W cross-tie 43(*a*) are both closed during all removal cycles, and it is still determined that an even further additional quantity of carrier gas needs to be removed from the polymerization system 100, several further options for removing additional carrier gas can then be used.

The first further option for removing additional carrier gas can include decreasing the fixed period of time that the polymer product can be transferred from the reactor 13 to one of the upstream lock hoppers. By decreasing the fixed period of time, a greater quantity of reactor gas will be transferred from the reactor 13 into line 23. A second further option can include supplying reactor gas from the reactor 13 via the gas vent line 46 to the product purge bin 24. The amount of reactor gas supplied from the reactor 13 via the gas vent line 46 can be increased until a maximum removal capacity of the product purge bin 24 has been reached. Once the fixed period of time has been decreased as much as desired and the maximum removal capacity of the product purge bin 24 has been reached, a third further option includes combining a portion of reactor gas in the gas vent line 46 with the vent column overhead in line 44 (e.g., via line 30), and sending to the flare via line 37. The amount of reactor gas that can be sent directly to flare via the combination of lines 46, 30, 44, and 37 can be increased to as large a quantity as needed to reduce the amount of carrier gas in the polymerization system 100 to a desired level. It should be understood that reactor gas can be sent to the flare from a line in fluid communication with the polymer production loop and/or a line in fluid communication with the reactor 13 and the flare and/or from any other suitable point within the polymerization system 100.

A fourth further option that can be used to remove additional carrier gas from the polymerization system 100 can be used before, during, and/or after any stage or step discussed above. There is a set period of time between steps (1a)-(5a) and steps (1b)-(5b) during which no polymer product and reactor gas is transferred from the reactor 13 to the upstream lock hopper 41(*a*) or 42(*a*) of either pair of lock hoppers 41(*a*)/41(*b*) and 42(*a*)/42(*b*). If it is determined additional carrier gas should be removed from the polymerization system 100, the set period of time between steps (1a)-(5a) and steps (1b)-(5b) can be increased. Increasing the set period of time between steps (1a)-(5a) and steps (1b)-(5b) during which no polymer product and reactor gas is transferred from the reactor 13 to the upstream lock hopper 41(*a*) or 42(*a*) causes additional carrier gas to be removed from the system. More particularly, the fixed period of time the polymer product and the reactor gas are transferred from the reactor 13 to the upstream lock hopper 41(*a*) or 42(*a*) decreases as the set period of time between steps (1a)-(5a) and steps (1b)-(5b) increases, which in turn causes the amount of polymer product transferred into the upstream lock hopper 41(*a*) or 42(*b*) to decrease, thus increasing the amount of reactor gas that flows into the upstream lock hopper 41(*a*) or 41(*b*). Preferably, increasing the set period of time between steps (1a)-(5a) and steps (1b)-(5b) would be implemented only after the vent column 40 reaches its maximum removal capacity.

In some embodiments, determining whether additional carrier gas needs to be removed from the polymerization system 100 can include sensing a pressure within the reactor 13. When the sensed pressure exceeds a pre-determined value, the removal of additional carrier gas can be initiated. In some embodiments, the pre-determined value can be 3,000 kPa-absolute, 2,800 kPa-absolute, 2,600 kPa-absolute, 2,400 kPa-absolute, 2,200 kPa-absolute, 2,000 kPa-absolute, 1,950 kPa-absolute, 1,900 kPa-absolute, 1,850 kPa-absolute, 1,800 kPa-absolute, 1,700 kPa-absolute, or 1,600 kPa-absolute.

Continuing with reference to FIG. 1, to recover hydrocarbons entrained with the polymer product and initiate purification of the product, the particulate polymer collected by the product discharge system 22 can be transferred by a conveying gas, such as nitrogen or a mixture of nitrogen and ethylene, via line 23 to a monomer stripping vessel 24 in the polymer recovery loop 12. The polymer product can enter the top of the vessel 24 and, as the polymer product flows downwardly through the vessel 24, the polymer product can be contacted with fresh and/or recycled stripping gas supplied to the bottom of the vessel via line 25. The countercurrent contact between the polymer product and the stripping gas can flush out reactor gas entrained in the polymer product and strip and desorb hydrocarbons, including unreacted monomer(s), dissolved in the polymer product. The stripping gas may be a gas inert to the polymerization process, such as nitrogen.

The stripped polymer product can exit the bottom of the vessel 24 and can be fed via line 26 to a finishing section (not shown), whereas the hydrocarbon-containing stripping gas effluent can exit the top of the vessel 24 and can be fed via line 27 to a low pressure side of a recovery compressor 28. The high pressure side of the compressor 28 can be connected to a condenser 29 where some of the hydrocarbons contained in the compressed stripping gas effluent can be condensed to produce a condensed liquid. The condensed liquid can be recovered in a condensed liquids drum 31 before being introduced into the vent column 40 via line 32. In some embodiments, at least a portion of the condensed liquids in line 32 can be removed from the system 100.

The gaseous component of the stripping gas effluent remaining after passage through the condenser 29 can be fed via line 33 to a split where a first portion can be removed and, after passage through a surge tank 34, can be recycled to line 23 to assist in conveying the polymer product from the reactor 13 to the stripping vessel 24. The remainder of the stripping gas effluent in line 33 can be fed by line 35 to a membrane separation system 36 where entrained hydrocarbons can be removed from the effluent before the remainder of the effluent is fed via line 37 to the flare (not shown).

A more detailed explanation as to how the product discharge system 22 can be operated will now be provided. As noted above, FIGS. 3 to 19 depict simplified schematic representations of the product delivery system 22 shown in FIG. 2 at different consecutive stages of system operation. More particularly, a preferred sequence of operations of the product discharge system 22 in transferring polymer product from the reactor 13 to the product recovery loop 12 is illustrated in FIGS. 3 to 19, in which the return valves G are omitted for simplicity. In addition, valves associated with the first pair of lock hoppers 41 can be referred to as "first" valves, for example, first valve B, while valves associated with the second pair of lock hoppers 42 can be referred to as "second" valves, for example, second valve B. To estimate the flows of material during the discharge operations, FIGS. 3 to 19 show polymer product (or polymer powder), reactor gas, and convey gas illustrated as discrete units (e.g., circles depicting a unit of each type of gas; and larger circles depicting the polymer product). Valves are shown as open with unfilled circles; and closed with filled or solid circles (for example, in FIG. 3, first valve B is open; second valve B is closed; valves W and X are closed, etc.). The following assumptions are made in these drawings and the ensuing description:

When a quantity of polymer product is discharged from the reactor into one of the upstream lock hoppers, that lock hopper loses all its contents to the reactor and receives one polymer product large unit, and 36 reactor gas units.

When a quantity of polymer product leaves the system, the associated downstream lock hopper loses all of its contents and receives 36 conveying gas units.

When W or X opens, the sending hopper sends half of its gas units to the receiving hopper. If the sending side would have to send a fractional unit, it instead keeps the whole number unit rather than splitting, for purposes of this illustrative discussion.

When D and H valves open, the associated upstream and downstream lock hoppers become well mixed and half of the well mixed gas units end up on each side. If there were a case in which a fractional unit would be made, the sending side always keeps the whole number unit for purposes of this illustrative discussion.

Figure 3:
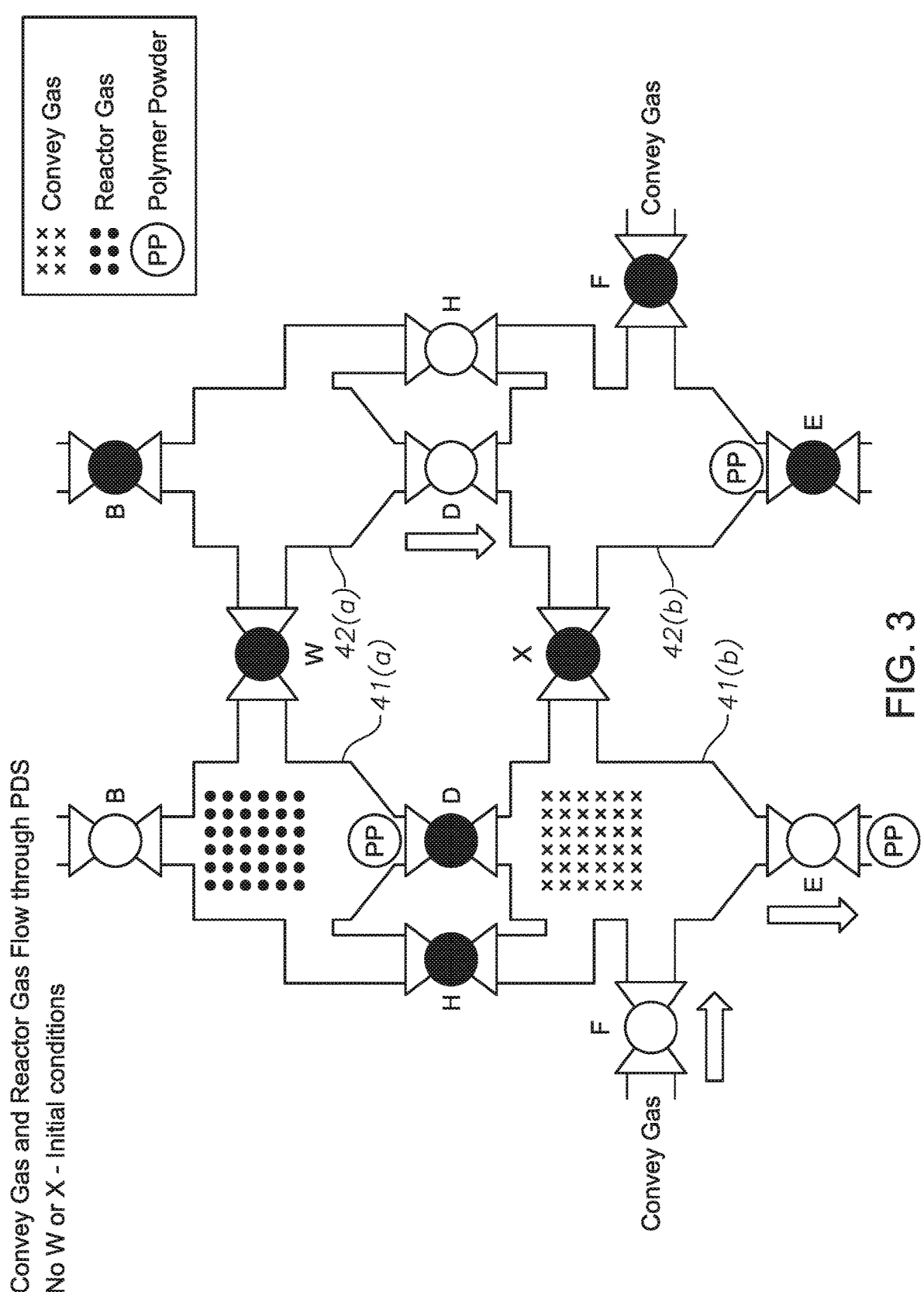
FIGS. 3 to 19 depict simplified schematic representations of the product delivery system shown in FIG. 2 at different consecutive stages of system operation.

FIG. 3 shows an initial position of the product discharge system 22 in which the following conditions apply:

first valve B (and first valve G not shown) is open and lock hopper 41(*a*) contains one polymer product unit and 36 reactor gas units;

first valves E and F are open so that a charge of polymer product previously-delivered to the lock hopper 41(*b*) is transported by the conveying gas to the product recovery loop 12 and the contents of the lock hopper 41(*b*) are replaced with 36 conveying gas units;

second valves D and H are open so that a charge of polymer product previously-delivered to the lock hopper 42(*a*) passes to the lock hopper 42(*b*); and the W and X cross-ties are closed.

Figure 4:
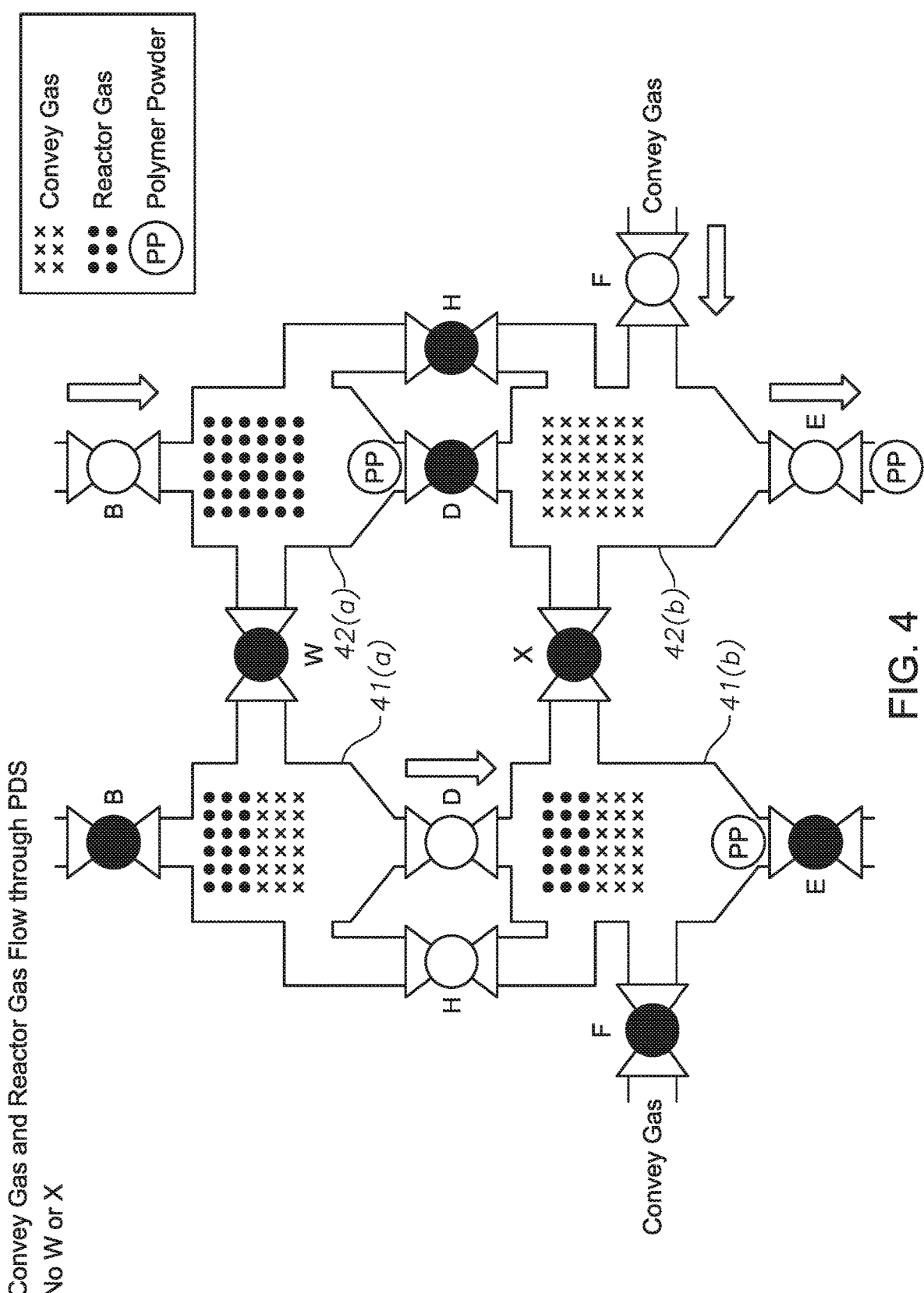

FIG. 4 shows the configuration of the product discharge system 22 at the next stage of operation after the initial position shown in FIG. 3, in which the positions of the various valves and the material flows are as follows:

first valves B, G, E and F are now closed and first valves D and H are open so that the charge of polymer product in the lock hopper 41(*a*) passes to the lock hopper 41(*b*) and each of the lock hoppers 41(*a*), 41(*b*) contains 18 units of reactor gas and 18 units of conveying gas;

second valve B (and second valve G not shown) is open and one polymer product unit and 36 reactor gas units flow from the reactor to the lock hopper 42(*a*);

second valves D and H are now closed and second valves E and F are open so that the charge of polymer product just delivered to the lock hopper 42(*b*) is transported by the conveying gas to the product recovery loop 12 and the contents of the lock hopper 42(*b*) are replaced with 36 conveying gas small units; and the W and X cross-ties remain closed.

Figure 5:
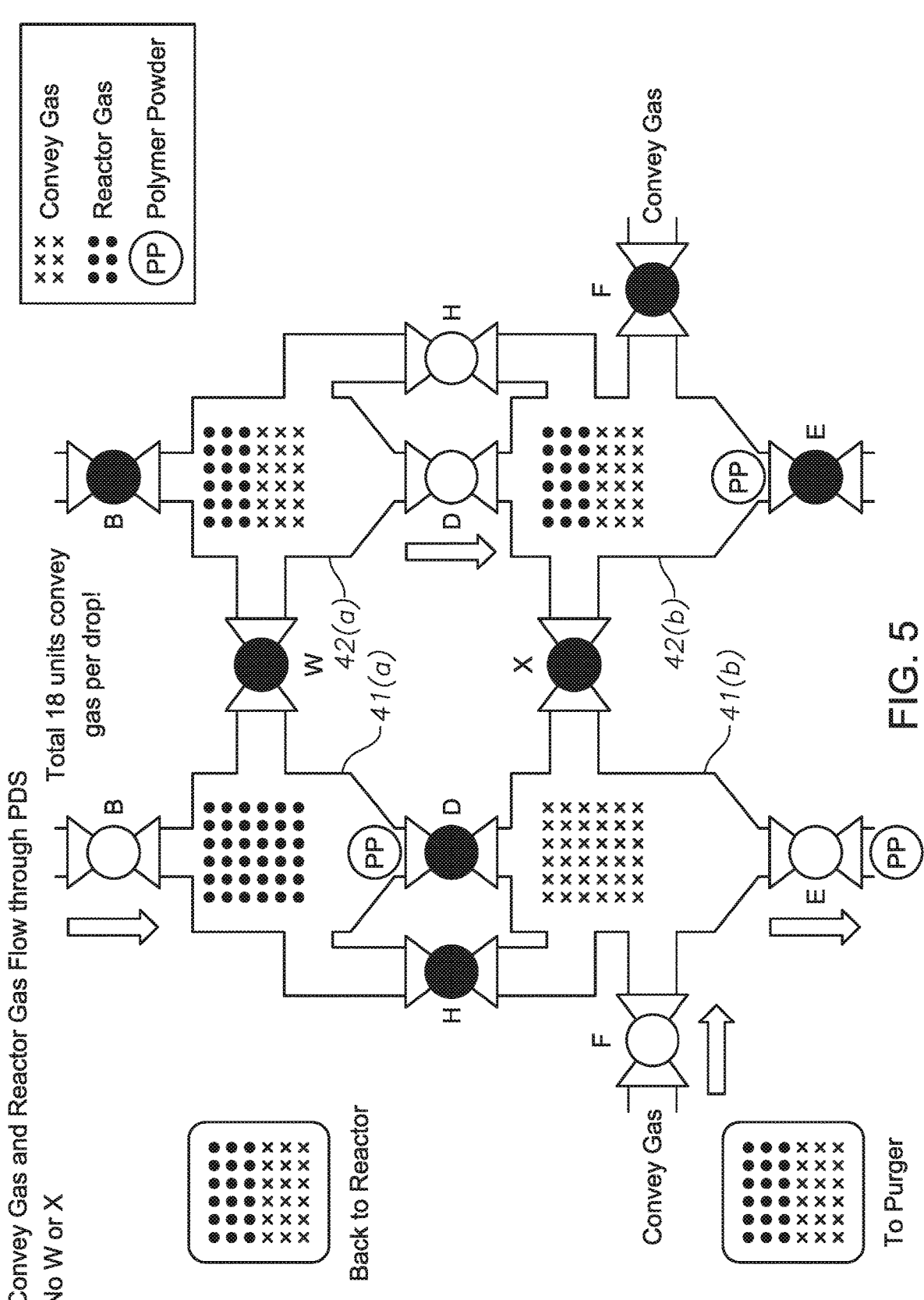

FIG. 5 shows the configuration of the product discharge system 22 at the next stage of operation after the position shown in FIG. 4, in which the positions of the various valves and the material flows are as follows:

first valves B and G are again open and lock hopper 41(*a*) contains one polymer product unit and 36 reactor gas units, the previous contents of the lock hopper 41(*a*), namely 18 units of reactor gas and 18 units of conveying gas having been transferred to the reactor through first valve G (not shown; although units transferred to reactor are shown to the side);

first valves D and H are now closed and first valves E and F are open so that the charge of polymer product just delivered to the lock hopper 41(*b*), together with 18 units of reactor gas and 18 units of conveying gas, are transferred to the product recovery loop 12 and the contents of the lock hopper 41(*b*) are replaced with 36 units of conveying gas;

second valves D and H are reopened and second valves E and F are closed so that the charge of polymer product just delivered to the lock hopper 42(*a*) flows to the lock hopper 42(*b*) and each of the lock hoppers 42(*a*), 42(*b*) contains 18 units of reactor gas and 18 units of conveying gas; and the W and X cross-ties remain closed.

Figure 6:
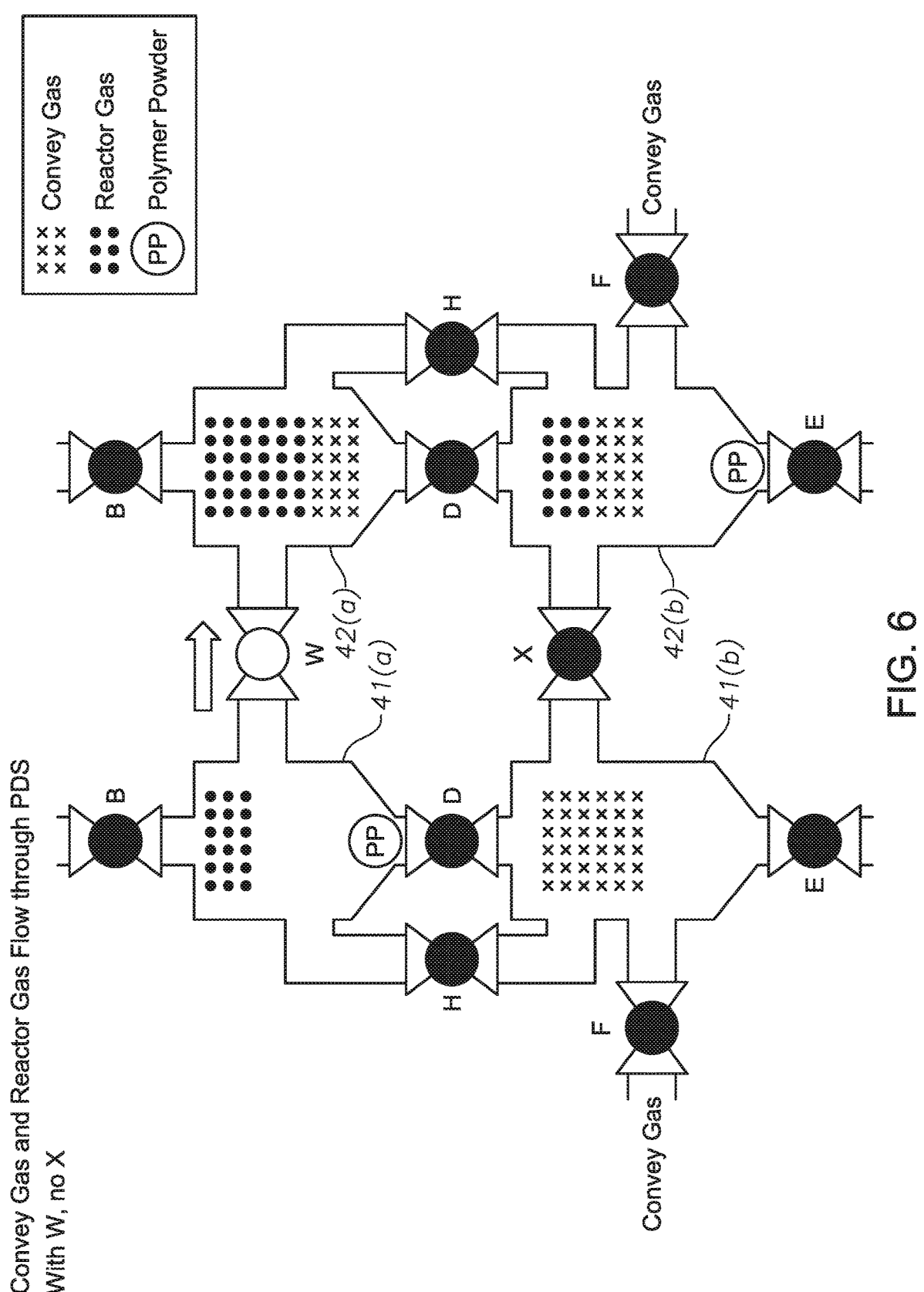

FIG. 6 shows the configuration of the product discharge system 22 at the next stage of operation after the position shown in FIG. 5, in which the cross-tie W is now opened while all the remaining valves (including the cross-tie X) are closed. As result, since the lock hopper 41(*a*) is at this stage at a higher pressure than the lock hopper 42(*a*), half of the gaseous contents of the lock hopper 41(*a*) are transferred via cross-tie W to lock hopper 42(*a*) to equilibrate the pressures. The lock hopper 41(*a*) then contains 18 units of reactor gas and lock hopper 42(*a*) contains 36 units of reactor gas and 18 units of conveying gas.

Figure 7:
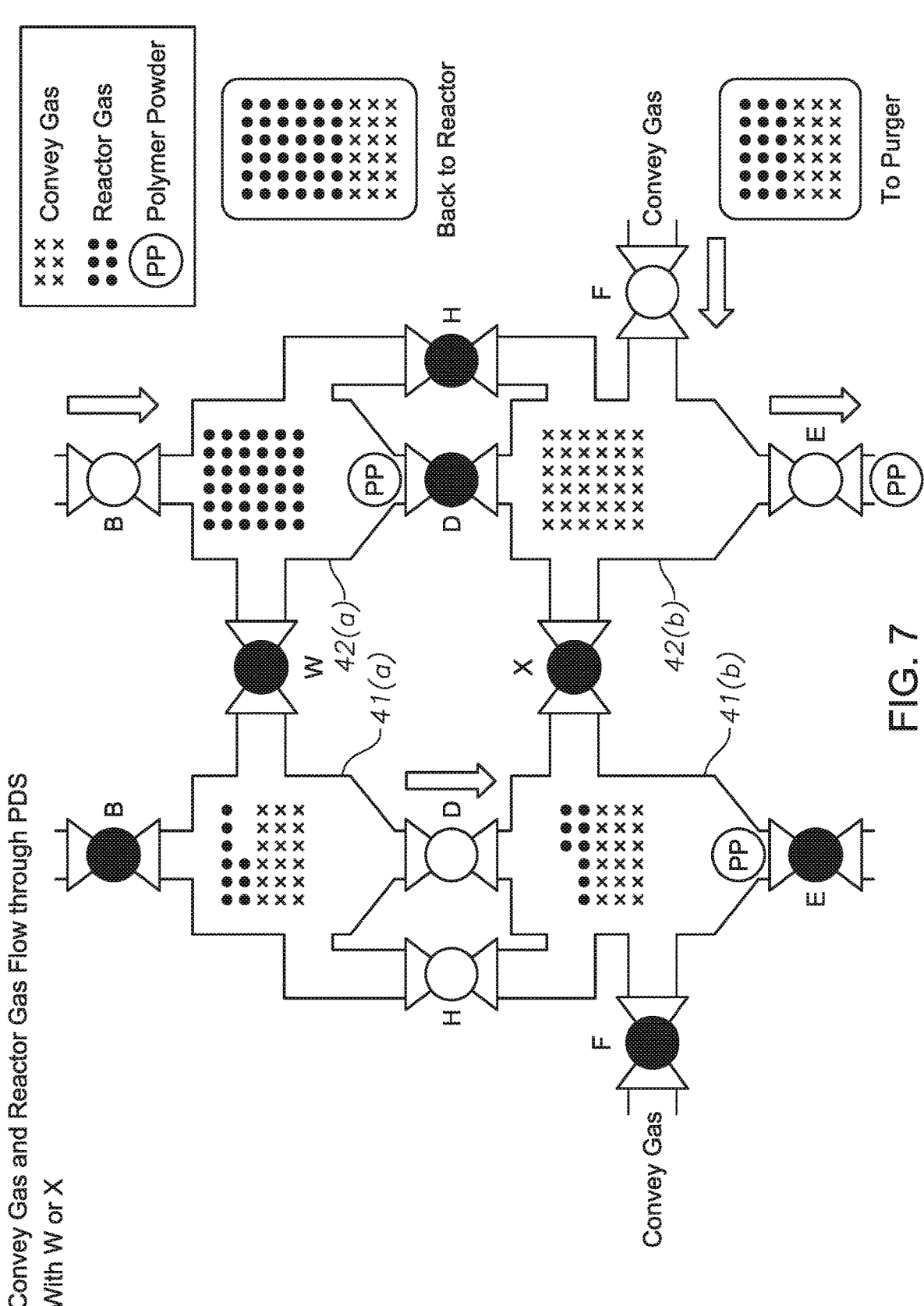

FIG. 7 shows the configuration of the product discharge system 22 at the next stage of operation after the position shown in FIG. 6, in which the positions of the various valves and the material flows are as follows:

first valves B, G, E and F remain now closed and first valves D and H are open so that the charge of polymer product in the lock hopper 41(*a*) passes to the lock hopper 41(*b*) and the gaseous contents of the lock hoppers 41(*a*), 41(*b*) are shared so that each contains 9 units of reactor gas and 18 units of conveying gas;

second valve B (and second valve G not shown) is open and a charge of polymer product and 36 units of reactor gas flow from the reactor into the lock hopper 42(*a*), the previous contents of the lock hopper 42(*a*), namely 36 units of reactor gas and 18 units of conveying gas having been transferred to the reactor through valve G;

second valves D and H remain closed and second valves E and F are open so that the charge of polymer product previously delivered to the lock hopper 42(*b*), together with 18 units of reactor gas and 18 units of conveying gas, are transferred to the product recovery loop 12 and the contents of the lock hopper 42(*b*) are replaced with 36 units of conveying gas;

the W and X cross-ties are closed.

Figure 8:
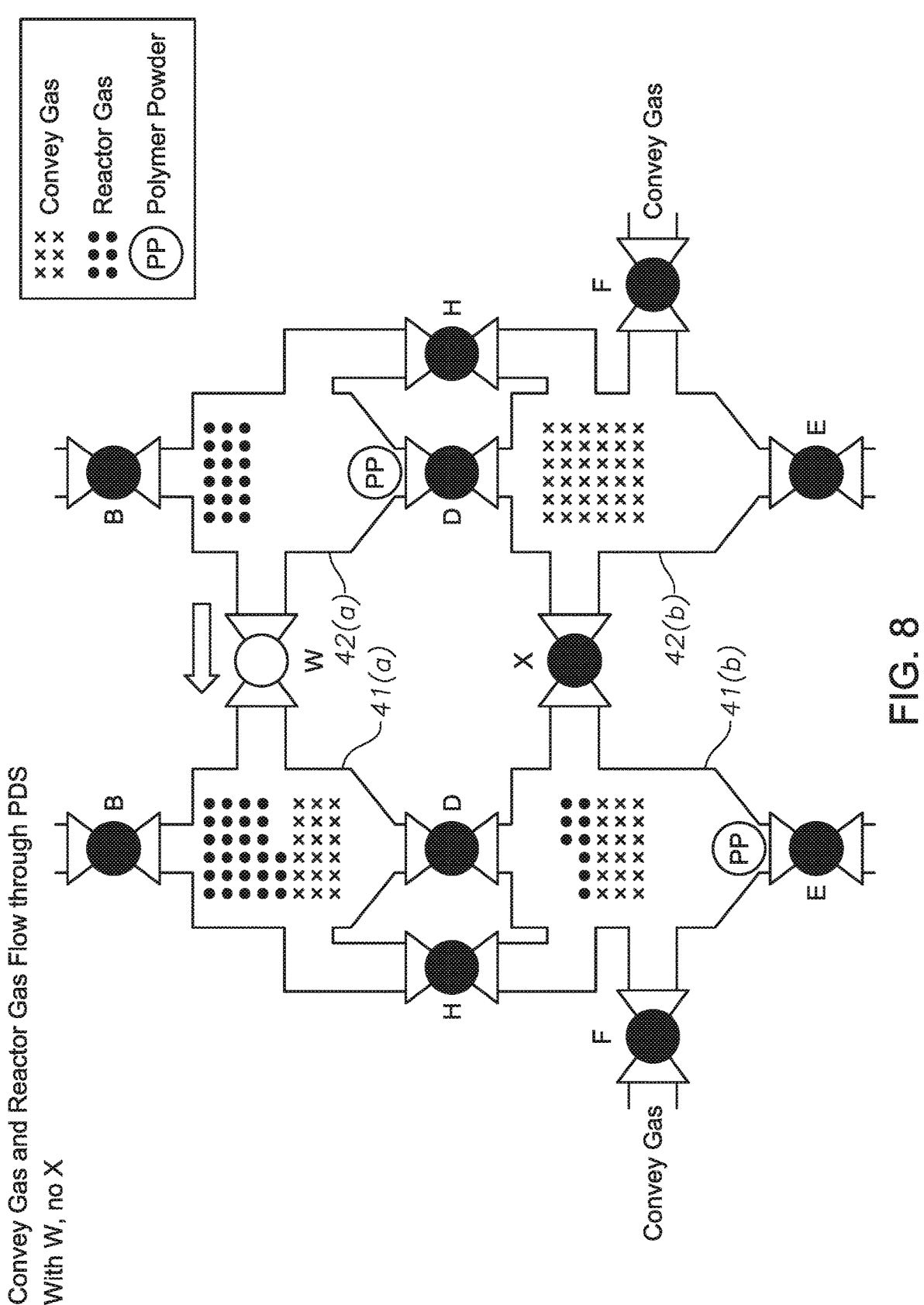

FIG. 8 shows the configuration of the product discharge system 22 at the next stage of operation after the position shown in FIG. 7, in which the cross-tie W is again opened while all the remaining valves (including the cross-tie X) are closed. As result, since the lock hopper 42(*a*) is now at a higher pressure than the lock hopper 41(*a*), half of the gaseous contents of the lock hopper 42(*a*) are transferred via cross-tie W to lock hopper 41(*a*) to equilibrate the pressures. The lock hopper 41(*a*) then contains 27 units of reactor gas and lock hopper 42(*a*) contains 18 units of reactor gas.

Figure 9:
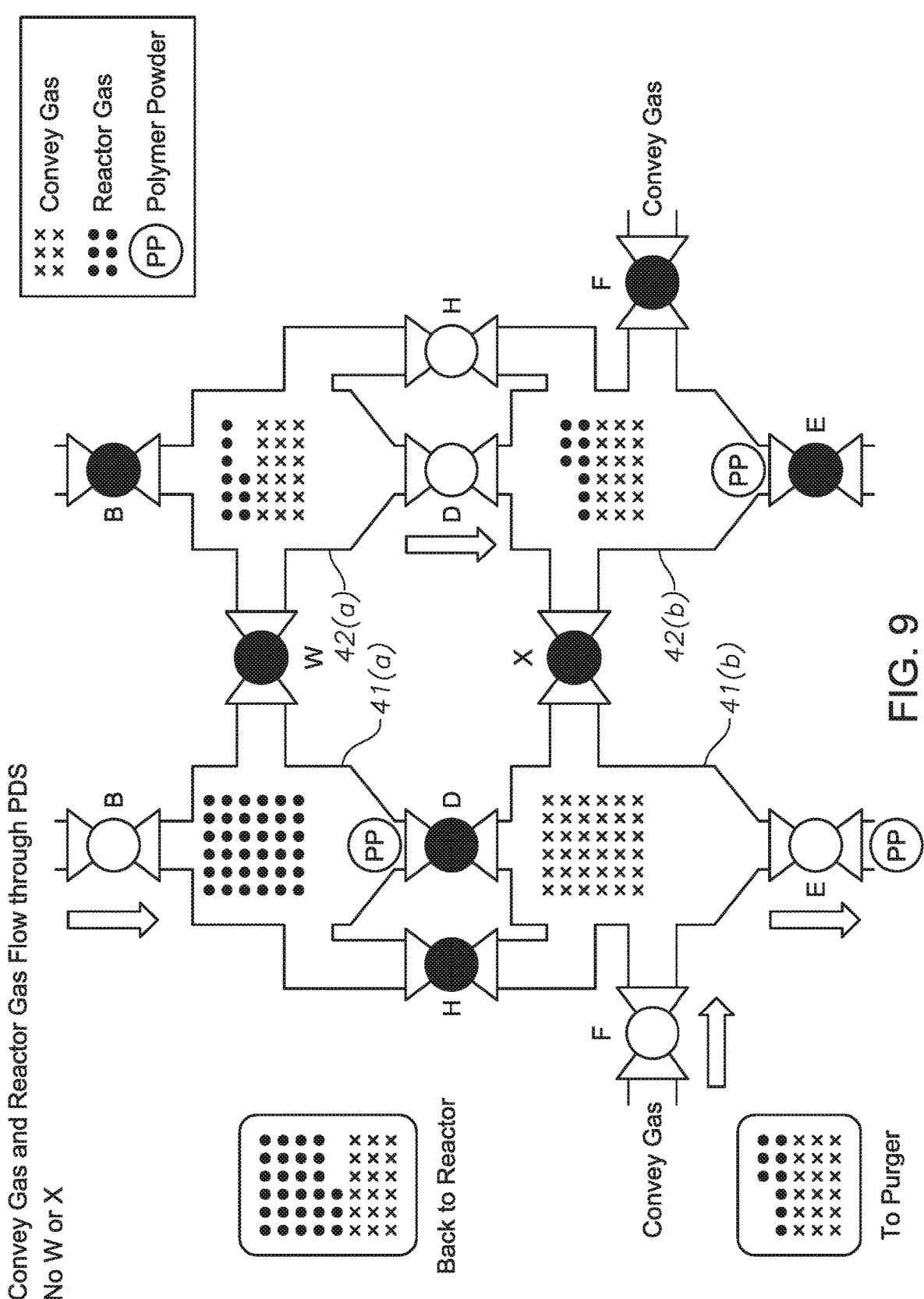

FIG. 9 shows the configuration of the product discharge system 22 at the next stage of operation after the position shown in FIG. 8, in which the positions of the various valves and the material flows are as follows:

first valve B (and first valve G not shown) is again open and lock hopper 41(*a*) contains a further charge of polymer product and 36 units reactor gas, the previous contents of the lock hopper 41(*a*), namely 27 units of reactor gas and 18 units of conveying gas having been transferred to the reactor through valve G;

first valves E and F are open so that a charge of polymer product previously-delivered to the lock hopper 41(*b*), together with 9 units of reactor gas and 18 units of conveying gas, are transported by the conveying gas to the product recovery loop 12 and the contents of the lock hopper 41(*b*) are replaced with 36 units of conveying gas;

second valves D and H are open so that a charge of polymer product previously delivered to the lock hopper 42(*a*) passes to the lock hopper 42(*b*) and the gaseous contents of the lock hoppers 42(*a*), 42(*b*) are shared so that each contains 9 units of reactor gas and 18 units of conveying gas; and the W and X cross-ties are closed.

Figure 10:
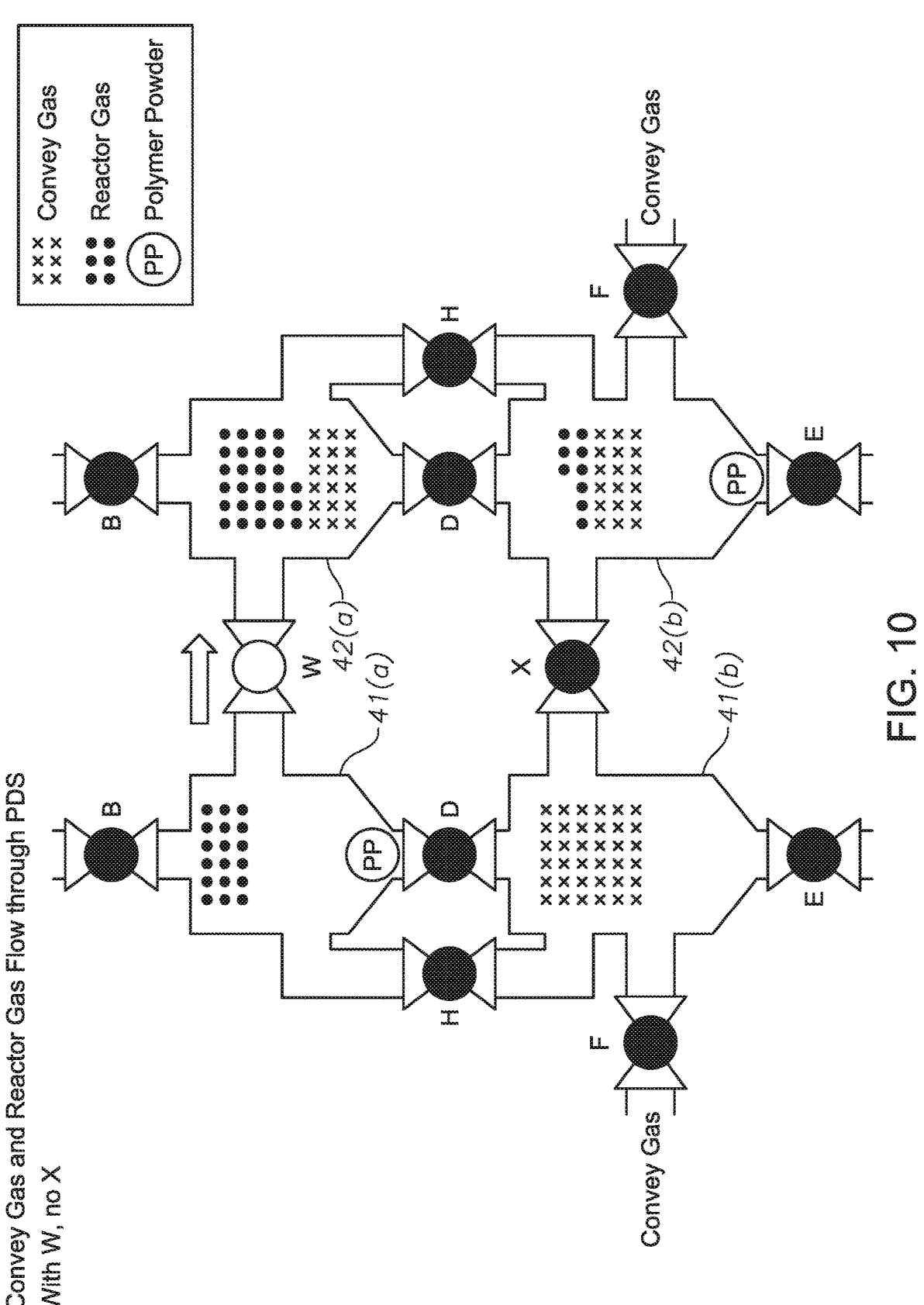

FIG. 10 shows the configuration of the product discharge system 22 at the next stage of operation after the position shown in FIG. 9, in which the cross-tie W is again opened while all the remaining valves (including the cross-tie X) are closed. As result, since the lock hopper 41(*a*) is now at a higher pressure than the lock hopper 42(*a*), half of the gaseous contents of the lock hopper 41(*a*) are transferred via cross-tie W to lock hopper 42(*a*) to equilibrate the pressures. The lock hopper 41(*a*) then contains 18 units of reactor gas and lock hopper 42(*a*) contains 27 units of reactor gas and 18 units of conveying gas.

Figure 11:
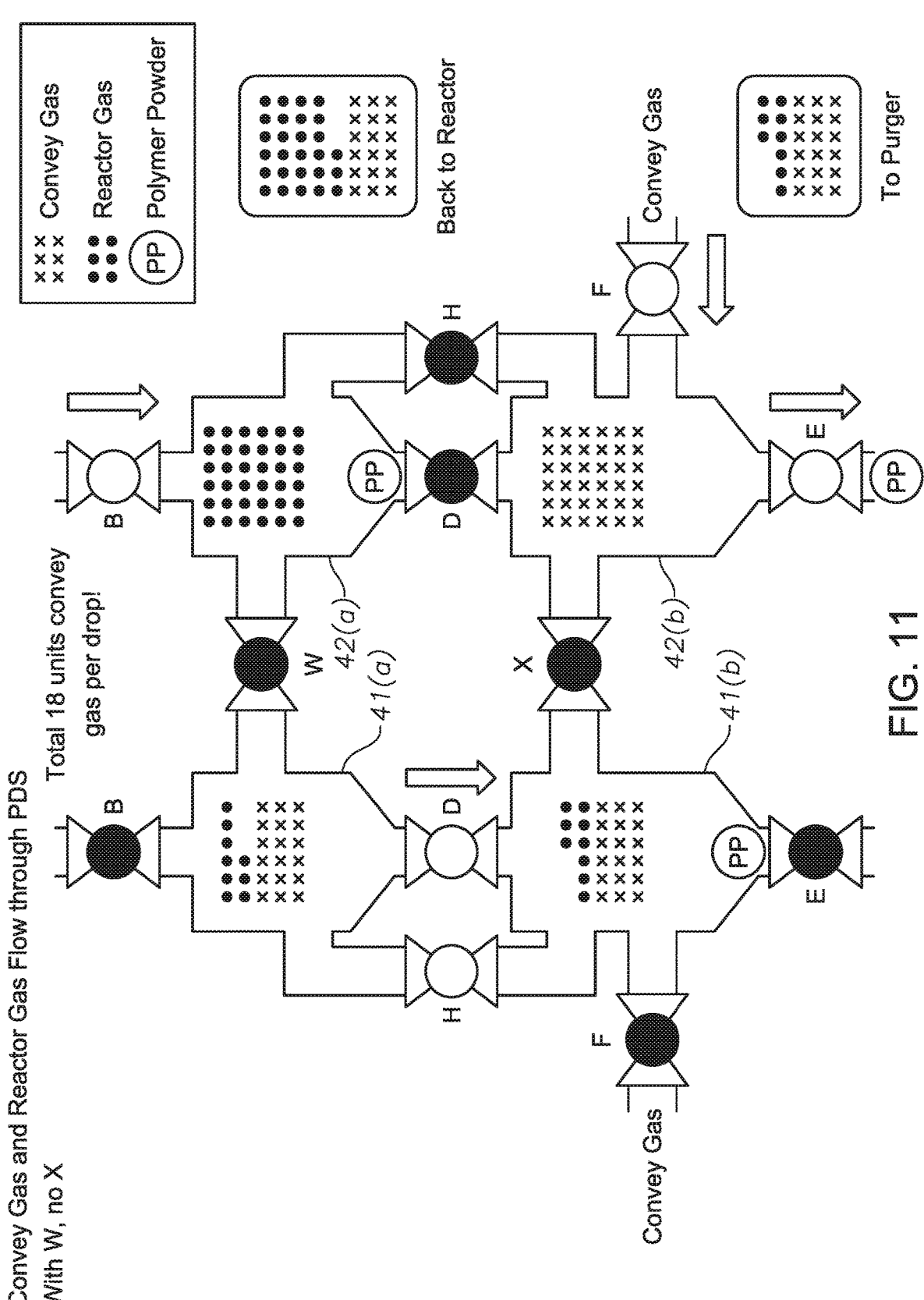

FIG. 11 shows the configuration of the product discharge system 22 at the next stage of operation after the position shown in FIG. 10, in which the positions of the various valves and the material flows are as follows:

first valves B, G, E and F remain closed and first valves D and H are open so that the charge of polymer product in the lock hopper 41(*a*) passes to the lock hopper 41(*b*) and the gaseous contents of the lock hoppers 41(*a*), 41(*b*) are shared so that each contains 9 units of reactor gas and 18 units of conveying gas;

second valve B (and second valve G not shown) is open and a charge of polymer product and 36 units of reactor gas flow from the reactor into the lock hopper 42(*a*), the previous contents of the lock hopper 42(*a*), namely 27 units of reactor gas and 18 units of conveying gas having been transferred to the reactor through valve G;

second valves D and H remain closed and second valves E and F are open so that the charge of polymer product previously delivered to the lock hopper 42(*b*), together with 9 units of reactor gas and 18 units of conveying gas, are transferred to the product recovery loop 12 and the contents of the lock hopper 42(*b*) are replaced with 36 units of conveying gas;

the W and X cross-ties are closed.

Figure 12:
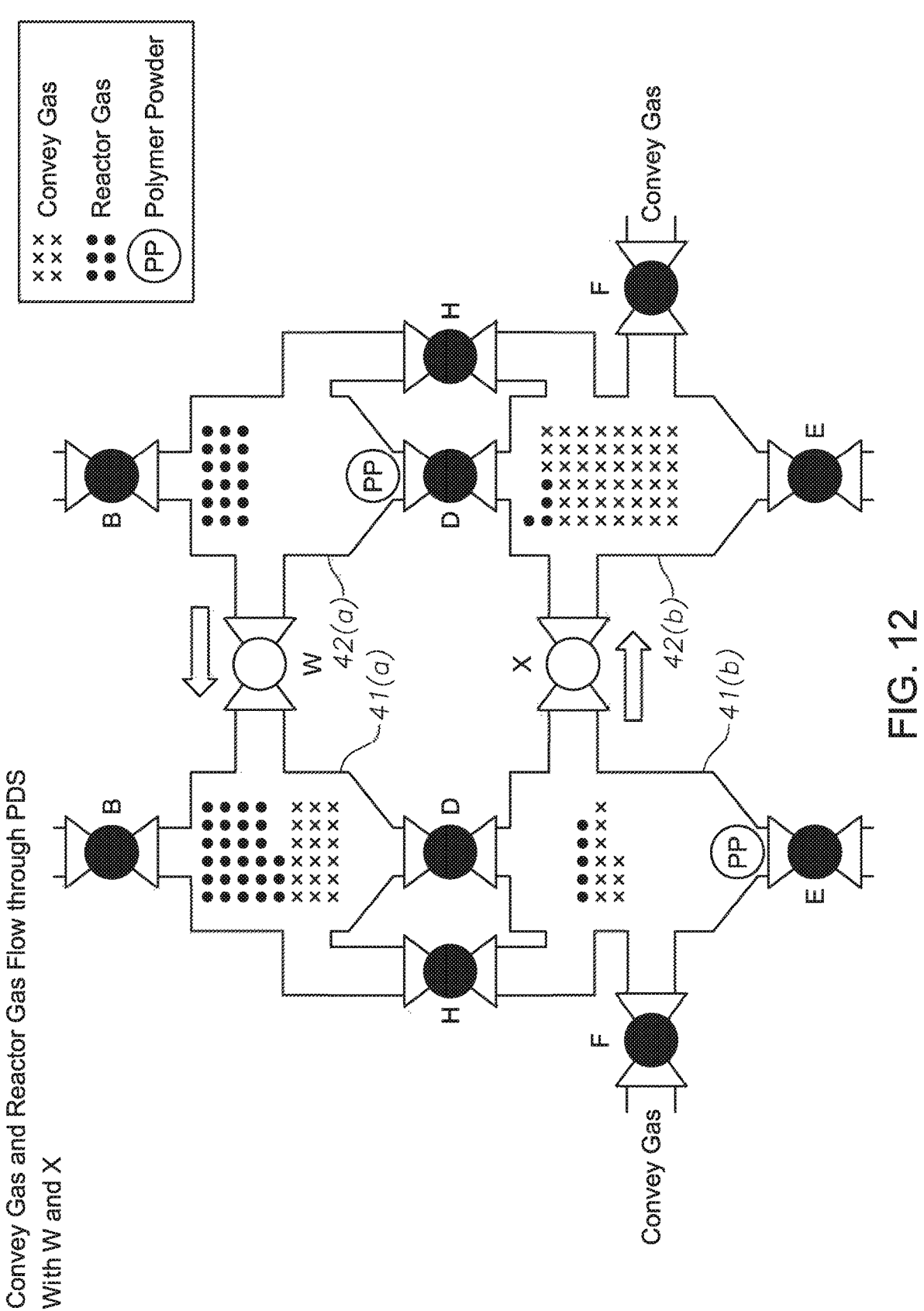

FIG. 12 shows the configuration of the product discharge system 22 at the next stage of operation after the position shown in FIG. 11, in which both cross-ties W and X are opened while all the remaining valves are closed. As result, since the lock hopper 42(*a*) is at a higher pressure than the lock hopper 41(*a*), half of the gaseous contents of the lock hopper 42(*a*) are transferred via cross-tie W to lock hopper 41(*a*) to equilibrate the pressures. The lock hopper 41(*a*) then contains 27 units of reactor gas and 18 units of conveying gas, while lock hopper 42(*a*) contains 18 units of reactor gas. Similarly, since the lock hopper 41(*b*) is at a higher pressure than the lock hopper 42(*b*), half of the gaseous contents of the lock hopper 41(*b*) are transferred via cross-tie X to lock hopper 42(*b*) to equilibrate the pressures. The lock hopper 41(*b*) then contains 5 units of reactor gas and 9 units of conveying gas, while lock hopper 42(*b*) contains 4 units of reactor gas and 45 units of conveying gas.

Figure 13:
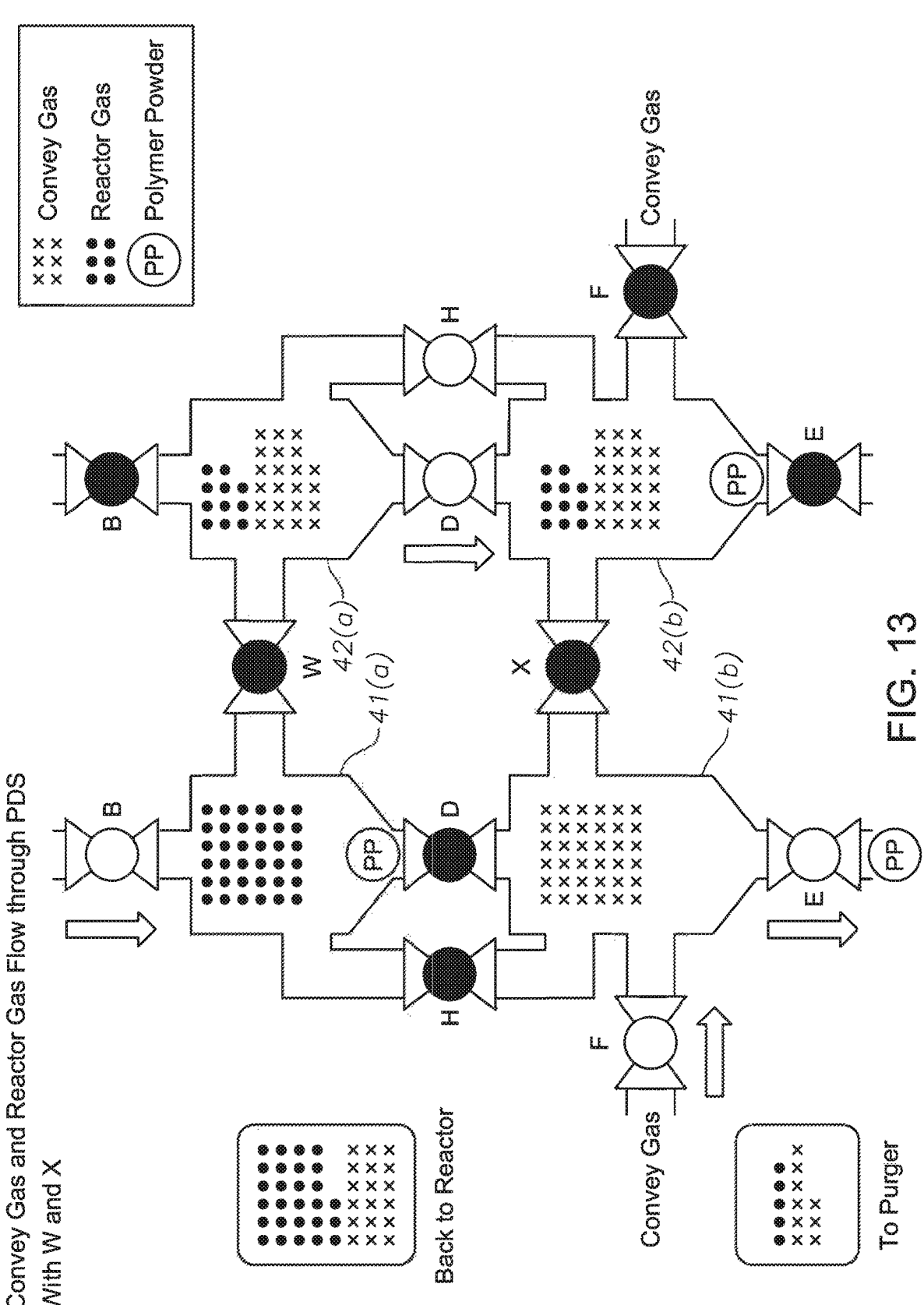

FIG. 13 shows the configuration of the product discharge system 22 at the next stage of operation after the position shown in FIG. 12, in which the positions of the various valves and the material flows are as follows:

first valve B (and first valve G not shown) is again open and lock hopper 41(*a*) contains a further charge of polymer product and 36 units reactor gas, the previous contents of the lock hopper 41(*a*), namely 27 units of reactor gas and 18 units of conveying gas, having been transferred to the reactor through valve G;

first valves E and F are open so that a charge of polymer product previously-delivered to the lock hopper 41(*b*), together with 5 units of reactor gas and 9 units of conveying gas, are transported by the conveying gas to the product recovery loop 12 and the contents of the lock hopper 41(*b*) are replaced with 36 units of conveying gas;

second valves D and H are open so that a charge of polymer product previously delivered to the lock hopper 42(*a*) passes to the lock hopper 42(*b*) and the gaseous contents of the lock hoppers 42(*a*), 42(*b*) are shared so that each contains 11 units of reactor gas and 22/23 units of conveying gas; and the W and X cross-ties are closed.

Figure 14:
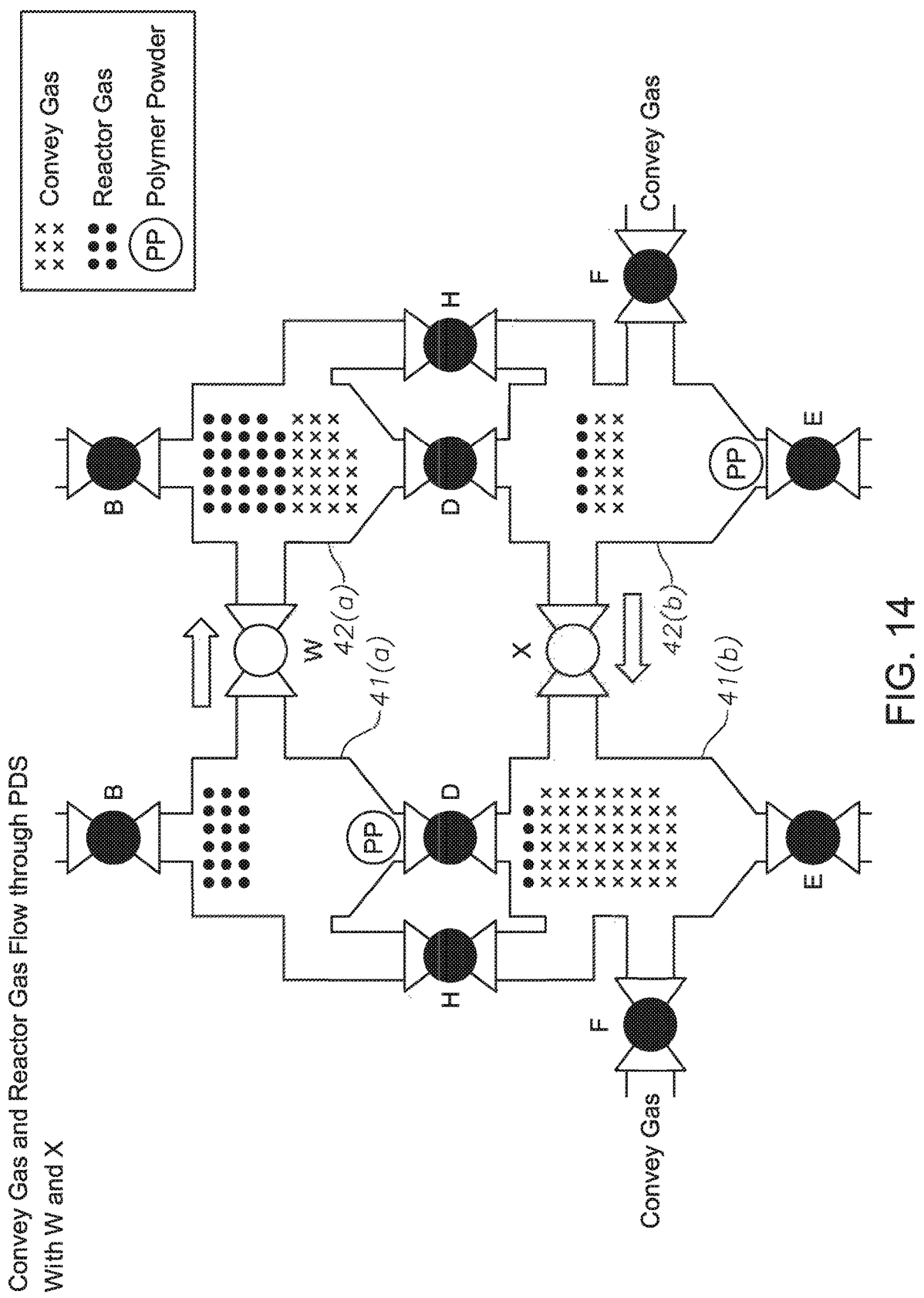

FIG. 14 shows the configuration of the product discharge system 22 at the next stage of operation after the position shown in FIG. 13, in which both cross-ties W and X are again opened while all the remaining valves are closed. As result, since the lock hopper 41(*a*) is at a higher pressure than the lock hopper 42(*a*), half of the gaseous contents of the lock hopper 41(*a*) are transferred via cross-tie W to lock hopper 42(*a*) to equilibrate the pressures. The lock hopper 41(*a*) then contains 18 units of reactor, while lock hopper 42(*a*) contains 29 units of reactor gas and 22 units of conveying gas. Similarly, since the lock hopper 42(*b*) is at a higher pressure than the lock hopper 41(*b*), half of the gaseous contents of the lock hopper 42(*b*) are transferred via cross-tie X to lock hopper 41(*b*) to equilibrate the pressures. The lock hopper 41(*b*) then contains 5 units of reactor gas and 47 units of conveying gas, while lock hopper 42(*b*) contains 6 units of reactor gas and 12 units of conveying gas.

Figure 15:
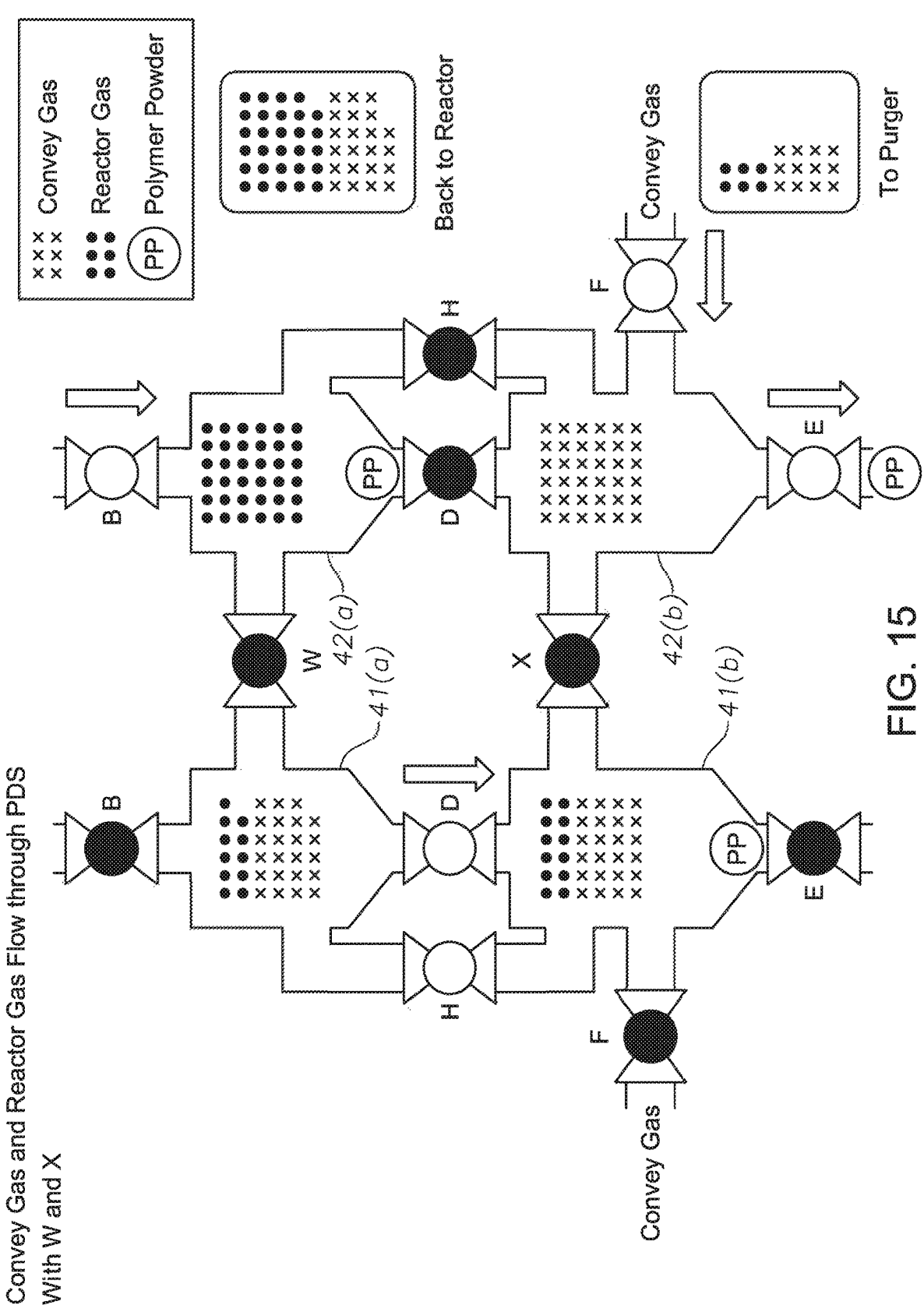

FIG. 15 shows the configuration of the product discharge system 22 at the next stage of operation after the position shown in FIG. 14, in which the positions of the various valves and the material flows are as follows:

first valves B, G, E and F remain closed and first valves D and H are opened so that the charge of polymer product in the lock hopper 41(*a*) passes to the lock hopper 41(*b*) and the gaseous contents of the lock hoppers 41(*a*), 41(*b*) are shared so that each contains 11/12 units of reactor gas and 23/24 units of conveying gas;

second valve B (and second valve G not shown) is open and a charge of polymer product and 36 units of reactor gas flow from the reactor into the lock hopper 42(*a*), the previous contents of the lock hopper 42(*a*), namely 29 units of reactor gas and 22 units of conveying gas, having been transferred to the reactor through valve G;

second valves D and H remain closed and second valves E and F are open so that the charge of polymer product previously delivered to the lock hopper 42(*b*), together with 6 units of reactor gas and 12 units of conveying gas, are transferred to the product recovery loop 12 and the contents of the lock hopper 42(*b*) are replaced with 36 units of conveying gas;

the W and X cross-ties are closed.

Figure 16:
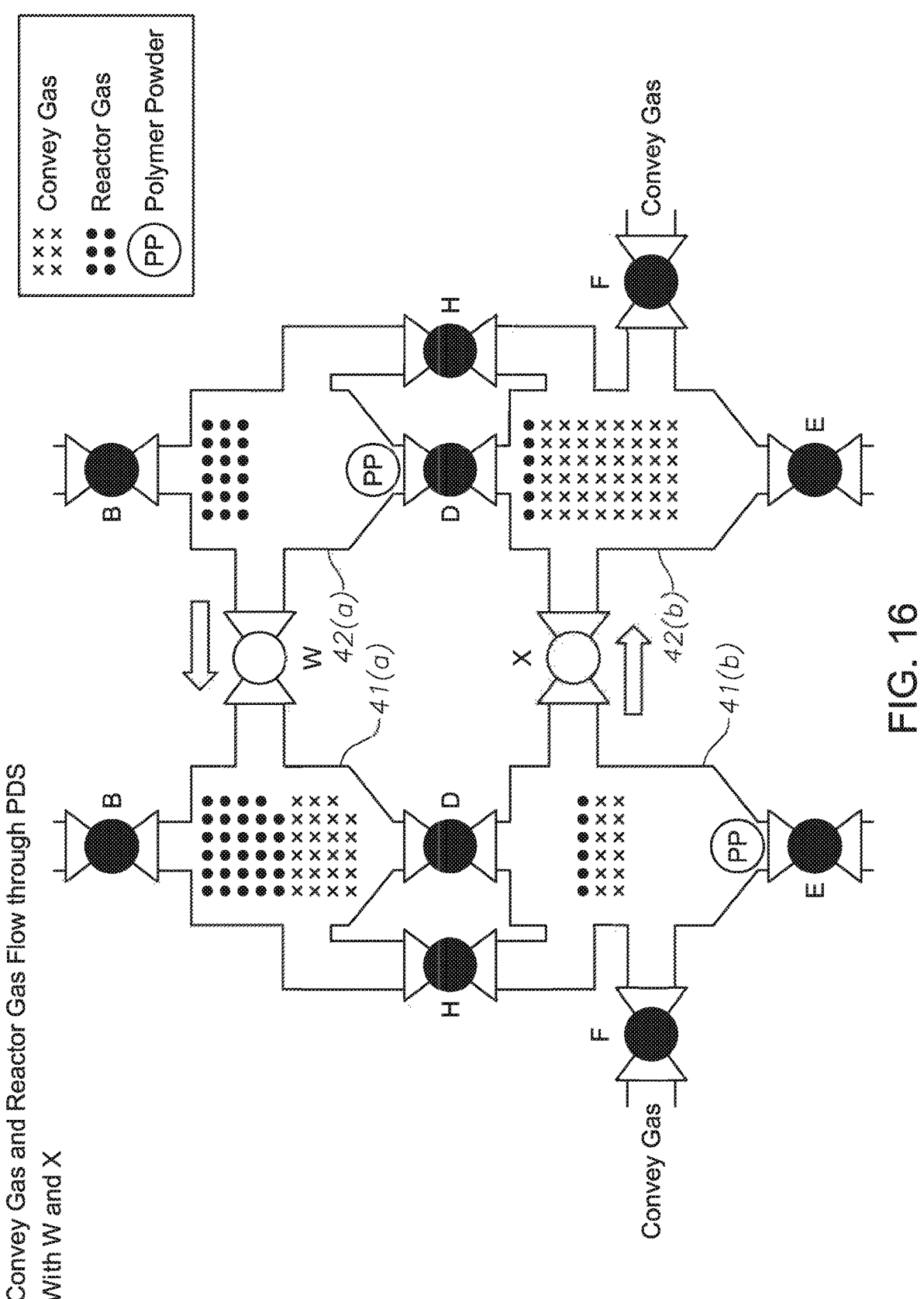

FIG. 16 shows the configuration of the product discharge system 22 at the next stage of operation after the position shown in FIG. 15, in which both cross-ties W and X are again opened while all the remaining valves are closed. As result, since the lock hopper 42(*a*) is at a higher pressure than the lock hopper 41(*a*), half of the gaseous contents of the lock hopper 42(*a*) are transferred via cross-tie W to lock hopper 41(*a*) to equilibrate the pressures. The lock hopper 41(*a*) then contains 29 units of reactor gas and 23 units of conveying gas, while lock hopper 42(*a*) contains 18 units of reactor gas. Similarly, since the lock hopper 41(*b*) is at a higher pressure than the lock hopper 42(*b*), half of the gaseous contents of the lock hopper 41(*b*) are transferred via cross-tie X to lock hopper 42(*b*) to equilibrate the pressures. The lock hopper 41(*b*) then contains 6 units of reactor gas and 12 units of conveying gas, while lock hopper 42(*b*) contains 6 units of reactor gas and 48 units of conveying gas.

Figure 17:
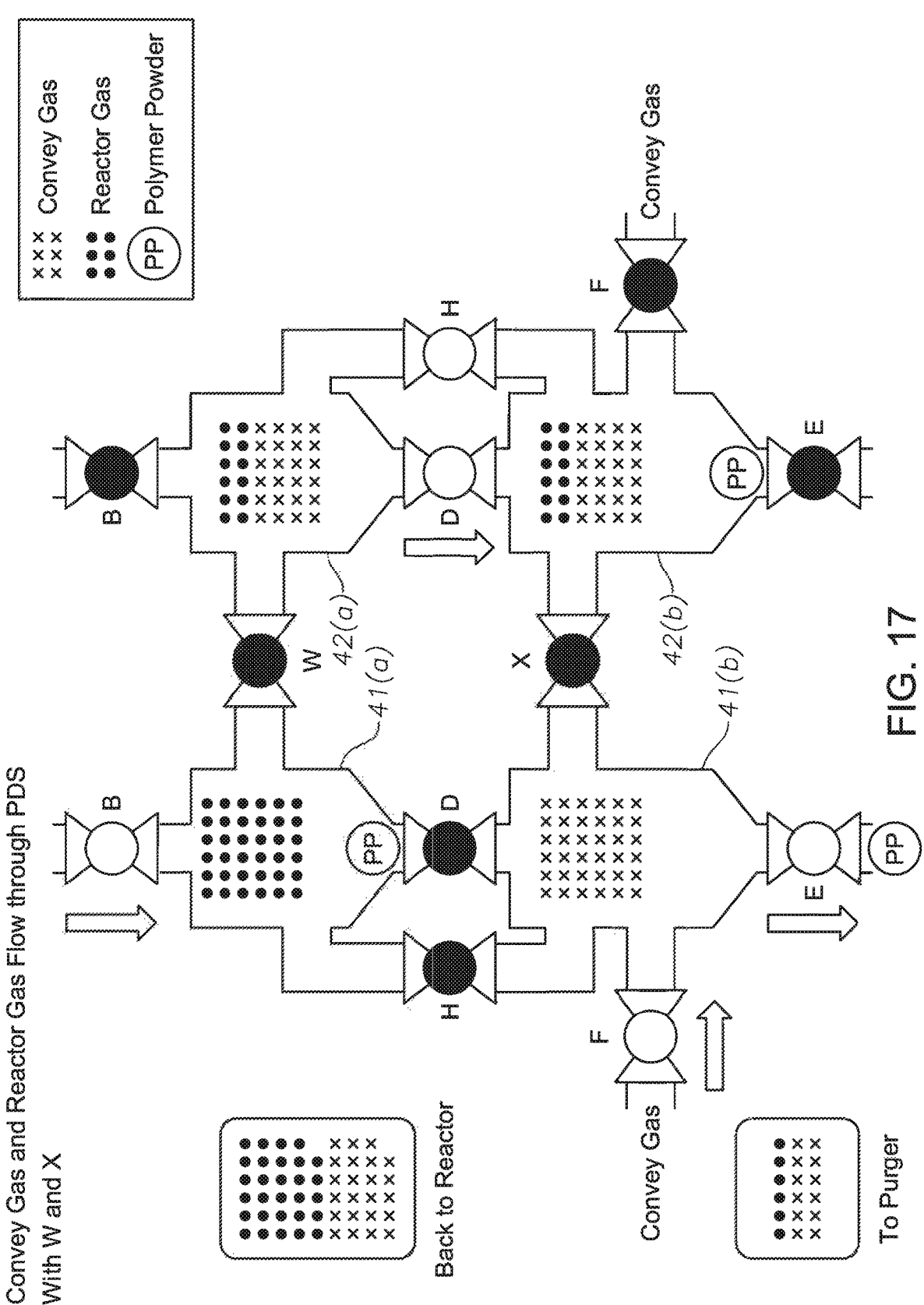

FIG. 17 shows the configuration of the product discharge system 22 at the next stage of operation after the position shown in FIG. 16, in which the positions of the various valves and the material flows are as follows:

first valve B (and first valve G not shown) is again open and lock hopper 41(*a*) contains a further charge of polymer product and 36 units of reactor gas, the previous contents of the lock hopper 41(*a*), namely 29 units of reactor gas and 23 units of conveying gas, having been transferred to the reactor through valve G;

first valves E and F are open so that a charge of polymer product previously-delivered to the lock hopper 41(*b*), together with 6 units of reactor gas and 12 units of conveying gas, are transported by the conveying gas to the product recovery loop 12 and the contents of the lock hopper 41(*b*) are replaced with 36 units of conveying gas;

second valves D and H are open so that a charge of polymer product previously delivered to the lock hopper 42(*a*) passes to the lock hopper 42(*b*) and the gaseous contents of the lock hoppers 42(*a*), 42(*b*) are shared so that each contains 12 units of reactor gas and 24 units of conveying gas; and the W and X cross-ties are closed.

Figure 18:
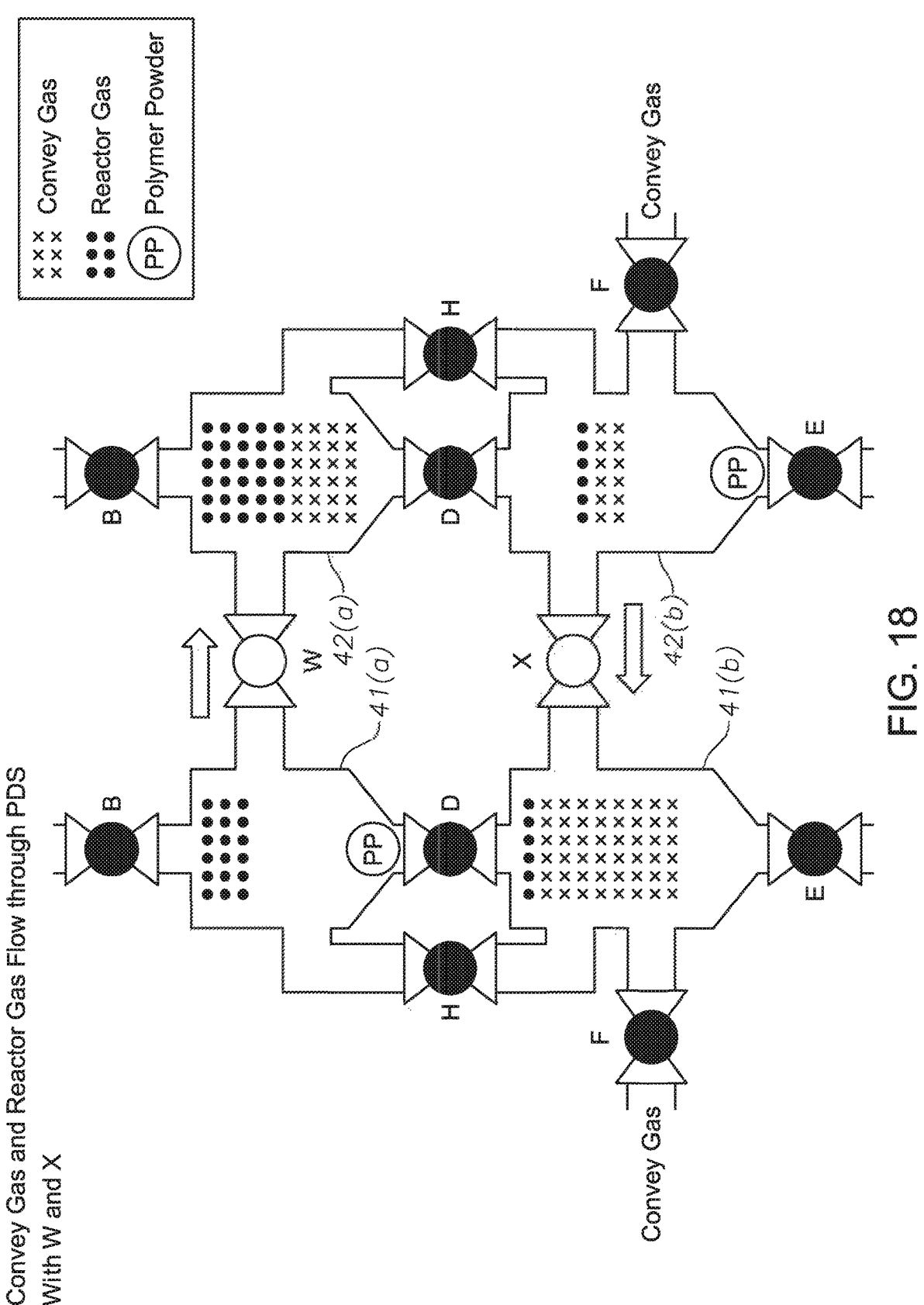

FIG. 18 shows the configuration of the product discharge system 22 at the next stage of operation after the position shown in FIG. 17, in which both cross-ties W and X are again opened while all the remaining valves are closed. As result, since the lock hopper 41(*a*) is at a higher pressure than the lock hopper 42(*a*), half of the gaseous contents of the lock hopper 41(*a*) are transferred via cross-tie W to lock hopper 42(*a*) to equilibrate the pressures. The lock hopper 41(*a*) then contains 18 units of reactor, while lock hopper 42(*a*) contains 30 units of reactor gas and 24 units of conveying gas. Similarly, since the lock hopper 42(*b*) is at a higher pressure than the lock hopper 41(*b*), half of the gaseous contents of the lock hopper 42(*b*) are transferred via cross-tie X to lock hopper 41(*b*) to equilibrate the pressures. The lock hopper 41(*b*) then contains 6 units of reactor gas and 48 units of conveying gas, while lock hopper 42(*b*) contains 6 units of reactor gas and 12 units of conveying gas.

Figure 19:
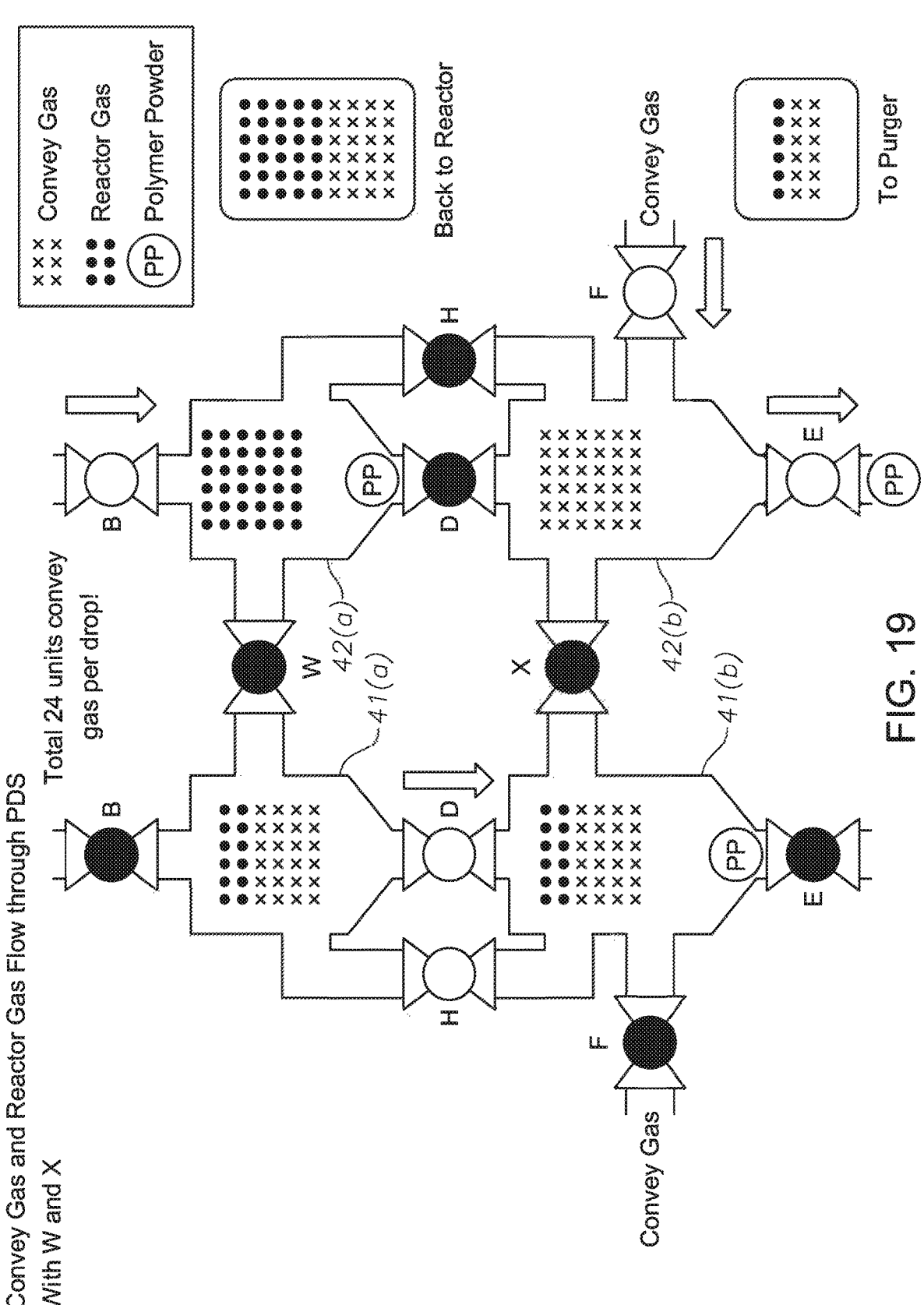

FIG. 19 shows the configuration of the product discharge system 22 at the next stage of operation after the position shown in FIG. 18, in which the positions of the various valves and the material flows are as follows:

is first valves B, G, E and F remain closed and first valves D and H are opened so that the charge of polymer product in the lock hopper 41(*a*) passes to the lock hopper 41(*b*) and the gaseous contents of the lock hoppers 41(*a*), 41(*b*) are shared so that each contains 12 units of reactor gas and 24 units of conveying gas;

second valve B (and second valve G not shown) is open and a charge of polymer product and 36 units of reactor gas flow from the reactor into the lock hopper 42(*a*), the previous contents of the lock hopper 42(*a*), namely 30 units of reactor gas and 24 units of conveying gas, having been transferred to the reactor through valve G;

second valves D and H remain closed and second valves E and F are open so that the charge of polymer product previously delivered to the lock hopper 42(*b*), together with 6 units of reactor gas and 12 units of conveying gas, are transferred to the product recovery loop 12 and the contents of the lock hopper 42(*b*) are replaced with 36 units of conveying gas;

the W and X cross-ties are closed.

Summarizing the results shown in FIGS. 3 to 5, it will be seen that, when a charge of polymer product is transferred from the reactor 13 to one of the upstream lock hoppers 41(*a*), 42(*a*) without previous opening of either of the W and X cross-ties, 18 units of reactor gas and 18 units of conveying gas flow back into the reactor through valve G. Similarly, FIG. 5 also shows that the simultaneous transfer of polymer product from the corresponding downstream lock hopper 41(*b*), 42(*b*) to the product recovery loop 12 is accompanied by the flow of 18 units of reactor gas and 18 units of conveying gas to the product recovery loop 12.

As shown in FIG. 11—when the system has reached equilibrium—when a charge of polymer product is transferred from the reactor 13 to one of the upstream lock hoppers 41(*a*), 42(*a*) after previous opening of the W, but not the X, cross-tie, 27 units of reactor gas and 18 units of conveying gas flow back into the reactor through valve G. Similarly, FIG. 11 shows that the simultaneous transfer of polymer product from the corresponding downstream lock hopper 41(*b*), 42(*b*) to the product recovery loop 12—when the system has reach equilibrium—is accompanied by the flow of 9 units of reactor gas and 18 units of conveying gas to the product recovery loop 12.

In contrast, FIG. 19 shows that, again after the system has reached equilibrium, when a charge of polymer product is transferred from the reactor 13 to one of the upstream lock hoppers 41(*a*), 42(*a*) after previous opening of both of the W and X cross-ties, 30 units of reactor gas and 24 units of conveying gas flow back into the reactor through valve G. Similarly, FIG. 19 also shows that the simultaneous transfer of polymer product from the corresponding downstream lock hopper 41(*b*), 42(*b*) to the product recovery loop 12 is accompanied by the flow of 6 units of reactor gas and 12 units of conveying gas to the product recovery loop 12.

In summary, the results shown in FIGS. 3 to 19 demonstrate that some of the conveying gas used to transport polymer product from the product discharge system 22 to the product recovery loop 12 inevitably flows back into the reactor and that the amount of intrusion of conveying gas into the reactor remains the same if the W and X cross-ties remain closed, or just the W cross-tie is opened, prior to a polymer charge drop. However, if the X cross-tie is opened before the polymer charge drop, the amount of intrusion of conveying gas into the reactor is increased, thereby increasing the potential need for direct venting from the reactor to control reactor pressure.

Gas phase polyethylene reactors of the type shown in FIGS. 1 and 2 have historically controlled pressure by increasing or decreasing the W valve utilization percentage of the product discharge system. The W cross-tie is opened after a charge of polymer product is delivered to one of the upstream lock hoppers to allow equalization in pressure with the other upstream lock hopper, thereby reducing net gas loss from the reactor during the next delivery of polymer product. Increasing the percent of deliveries during which the W valve is used decreases gas flow from the reactor. Conversely, if reactor pressure is high, the W valve utilization can decrease, increasing the rate of material removal from the reactor.

Modelling has now shown that the use of the X cross-tie reduces the net nitrogen reduction of the system as not only does it reduce gas loss from the reactor during product discharge, but also forces more nitrogen from conveying gas back into the reactor. Therefore, if there is a need to remove nitrogen from the reactor, it is more efficient to remove nitrogen from the reactor by optimizing the use of the optional X cross-tie (and increasing the amount of gas removed with the polymer product) than to vent gas from the reactor directly. This is because in addition to gas removal, optimizing the scheduled use of the X cross-tie to be used results in less nitrogen being added to the reactor by the product delivery system.

Operation of the X cross-tie can be scheduled by a controller that treats the analog at action of the X cross-tie as a digital control valve by sensing the pressure in the reactor; and reducing the optional operation of the X cross-tie during removal cycles when the sensed reactor pressure exceeds a predetermined value, such as when the sensed reactor pressure exceeds 1,800 kPa-absolute, or exceeds 2,000 kPa-absolute. The controller can reduce X cross-tie use by scheduling product discharge cycles to occur without the X cross-tie step. If the reactor pressure controller is calling for direct venting of reactor gas, the scheduler will call for more cycles without the X cross-tie, resulting in each cycle removing more reactor gas. The reduction of nitrogen from the product discharge system due to the decrease or stopping of the X cross-tie use can hasten the pressure change and reduce or even prevent the need for direct reactor venting. This results in a net reduction of gas venting from the reactor.

Operation of the W cross-tie can be scheduled by a controller that treats the analog action of the W cross-tie as a digital control valve by sensing the pressure in the reactor and reducing the optional operation of the W cross-tie during removal cycles when the X cross-tie has ceased being opened during any removal cycle and the sensed reactor pressure exceeds a predetermined value, such as when the sensed reactor pressure exceeds 1,800 kPa-absolute, or exceeds 2,000 kPa-absolute. The controller can reduce W cross-tie use by scheduling product discharge cycles to occur without the W cross-tie step. If the reactor pressure controller is calling for direct venting of reactor gas, the scheduler will call for more cycles without the W cross-tie, resulting in each cycle removing more reactor gas. The reduction of nitrogen from the product discharge system due to the decrease or stopping of the W cross-tie use can hasten the pressure change and reduce or even prevent the need for direct reactor venting. This results in a net reduction of gas venting from the reactor.

Once use of the X cross-tie step and use of the W cross-tie have both stopped during all removal cycles, additional carrier gas can be removed from the polymerization system by: (i) decreasing the fixed period of time the polymer product and the reactor gas are transferred from the reactor 13 to (1a) the upstream lock hopper 41(*a*) of the first pair of lock hoppers 41(*a*)/41(*b*) or (1b) the upstream lock hopper 42(*a*) of the second pair of lock hoppers 42(*a*)/42(*b*); (ii) supplying reactor gas from the reactor 13 via the gas vent line 46 to the product purge bin 24 and then (iii) increasing the amount of the reactor gas supplied from the reactor 13 via the gas vent line 46 to the product purge bin 24 until a maximum removal capacity of the product purge bin 24 is reached; and/or (iv) supplying additional reactor gas from the reactor via the combination of lines 46, 30, 44, and 37 directly to the flare until a sufficient amount of carrier gas is removed from the gas phase polymerization system 100. In some embodiments, options (i), (ii), and (iii) can preferably be employed before option (iv). In some embodiments, option (i) can be carried out first, followed by option (ii), then option (iii), and then option (iv).

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process for venting a gas phase polymerization reactor, comprising:

(a) providing a gas phase polymerization system comprising a reactor, a reactor recycle loop in fluid communication with an outlet and an inlet of the reactor, a flare in fluid communication with the reactor recycle loop, a vent column in fluid communication with the reactor recycle loop and the flare, a product discharge system comprising first and second pairs of lock hoppers and a product purge bin, and a gas vent line in fluid communication with the reactor and the product purge bin, wherein each pair of lock hoppers comprises an upstream lock hopper connected by a valve to the reactor and a downstream lock hopper connected by a valve to the upstream lock hopper and connected by a valve to the product purge bin, wherein a first cross-tie is provided between the upstream lock hoppers of the first and second pairs of lock hoppers and a second cross-tie is provided between the downstream lock hoppers of the first and second pairs of lock hoppers, and wherein the first and second cross-ties each comprise a valve configured to selectively allow and to selectively prevent fluid communication between the upstream lock hoppers and the downstream lock hoppers, respectively;

(b) supplying an olefin monomer, a carrier gas, and a particulate catalyst to the reactor under conditions effective to maintain the particulate catalyst in a fluidized state and to polymerize the olefin monomer in the presence of the particulate catalyst to produce a polymer product;

(c) supplying a reactor overhead comprising a reactor gas from the outlet of the reactor to the reactor recycle loop, wherein the reactor gas comprises unreacted olefin monomer and carrier gas;

(d) supplying a first portion of the reactor overhead in the reactor recycle loop to the vent column;

(e) contacting the first portion of the reactor overhead with a stripping medium within the vent column to remove at least a portion of the olefin monomer to produce a vent column overhead rich in the carrier gas and lean in the olefin monomer and a vent column bottoms rich in the olefin monomer and lean in the carrier gas;

(f) supplying the vent column overhead to the flare;

(g) supplying a second portion of the reactor overhead in the reactor recycle loop and the vent column bottoms to the reactor;

(h) removing the polymer product and an additional quantity of reactor gas from the reactor through the first and second pairs of lock hoppers in removal cycles, wherein each removal cycle (h) includes the steps of:

(1) transferring polymer product and reactor gas from the reactor to (1a) the upstream lock hopper of the first pair of lock hoppers and equilibrating the pressure therebetween or (1b) the upstream lock hopper of the second pair of lock hoppers and equilibrating the pressure therebetween;

(2) while performing step (1), transferring polymer product and reactor gas from (2a) the upstream lock hopper to the downstream lock hopper of the second pair of lock hoppers and equilibrating the pressure therebetween or (2b) the upstream lock hopper to the downstream lock hopper of the first pair of lock hoppers and equilibrating the pressure therebetween;

(3) while performing steps (1) and (2), transferring polymer product using a conveying gas from (3a) the downstream lock hopper of the first pair of lock hoppers to the product purge bin or (3b) the downstream lock hopper of the second pair of lock hoppers to the product purge bin;

(4) after performing steps (1), (2), and (3), passing reactor gas from (4a) the upstream lock hopper of the first pair of lock hoppers to the upstream lock hopper of the second pair of lock hoppers via the first cross-tie to equilibrate the pressure therebetween or (4b) the upstream lock hopper of the second pair of lock hoppers to the upstream lock hopper of the first pair of lock hoppers via the first cross-tie to equilibrate the pressure therebetween; and further wherein some or all of the removal cycles (h) further include the step of:

(5) after performing steps (1), (2), and (3), passing reactor gas from (5a) the downstream lock hopper of the first pair of lock hoppers to the downstream lock hopper of the second pair of lock hoppers via the second cross-tie to equilibrate the pressure therebetween or (5b) the downstream lock hopper of the second pair of lock hoppers to the downstream lock hopper of the first pair of lock hoppers via the second cross-tie to equilibrate the pressure therebetween;

wherein steps (1a), (2a), (3a), (4a), and (5a) or steps (1b), (2b), (3b), (4b), and (5b), respectively, are carried out in sequential order and in alternating removal cycles (h) with respect to one another;

(i) determining an additional quantity of carrier gas needs to be removed from the gas phase polymerization system;

(j) increasing an amount of the first portion of the reactor overhead in the reactor recycle loop supplied to the vent column until a maximum removal capacity of the vent column is reached; and (k) reducing the frequency of step (5) such that after performing steps (1), (2), and (3), the reactor gas is passed from one of the downstream lock hoppers to the other downstream lock hopper via the second cross-tie in some, but not all, of the removal cycles (h).

2. The process of claim 1, further comprising:

(l) determining additional carrier gas needs to be removed from the gas phase polymerization system; and (m) ceasing step (5) such that the valve of the second cross-tie prevents fluid communication between the downstream lock hoppers during all of the removal cycles (h).

3. The process of claim 2, further comprising:

(n) determining additional carrier gas needs to be removed from the gas phase polymerization system; and (o) reducing the frequency of step (4) such that after performing steps (1), (2), and (3), the reactor gas is passed from one of the upstream lock hoppers to the other upstream lock hopper via the first cross-tie in some, but not all, of the removal cycles (h).

4. The process of claim 3, further comprising:

(p) determining additional carrier gas needs to be removed from the gas phase polymerization system; and (q) ceasing step (4) such that the valve of the first cross-tie prevents fluid communication between the upstream lock hoppers during all of the removal cycles (h).

5. The process of claim 4, wherein the polymer product and the reactor gas are transferred from the reactor to (1a) the upstream lock hopper of the first pair of lock hoppers or (1b) the upstream lock hopper of the second pair of lock hoppers for a fixed period of time during each removal cycle (h), the process further comprising:

(r) determining additional carrier gas needs to be removed from the gas phase polymerization system; and (s) decreasing the fixed period of time.

6. The process of claim 4, further comprising:

(t) determining additional carrier gas needs to be removed from the gas phase polymerization system; and (u) supplying reactor gas from the reactor via the gas vent line to the product purge bin.

7. The process of claim 4, further comprising:

(v) determining additional carrier gas needs to be removed from the gas phase polymerization system; and (w) increasing the amount of the reactor gas supplied from the reactor via the gas vent line to the product purge bin until a maximum removal capacity of the product purge bin is reached.

8. The process of claim 4, further comprising:

(x) determining additional carrier gas needs to be removed from the gas phase polymerization system; and (y) supplying reactor gas from the reactor to the flare until a sufficient amount of carrier gas is removed from the gas phase polymerization system.

9. The process of claim 1, wherein there is a set period of time between steps (1a)-(5a) and steps (1b)-(5b) during which no polymer product and reactor gas is transferred from the reactor to the upstream lock hopper of either pair of lock hoppers, the process further comprising:

(z) determining additional carrier gas needs to be removed from the gas phase polymerization system; and (aa) increasing the set period of time between steps (1a)-(5a) and steps (1b)-(5b) during which no polymer product and reactor gas is transferred from the reactor into the upstream lock hopper of either pair of lock hoppers.

10. The process of claim 1, wherein the carrier gas and conveying gas each comprise molecular nitrogen.

11. The process of claim 1, wherein the carrier gas comprises molecular nitrogen, and wherein conveying gas comprises a mixture of molecular nitrogen and ethylene.

12. The process of claim 1, wherein the olefin monomer comprises ethylene.

13. The process of claim 1, wherein the olefin monomer comprises ethylene and at least one $C_3$ to $C_8$ alpha-olefin.

14. The process of claim 1, wherein the polymerization of the olefin monomer in step (b) is conducted under conditions such that the olefin monomer is in the gas phase.

15. The process of claim 1, wherein the polymerization of the olefin monomer in step (b) is conducted under conditions including a temperature of 70° C. to 110° C. and a pressure of 1,500 kPa-absolute to 3,000 kPa-absolute.

16. The process of claim 1, wherein determining additional carrier gas needs to be removed from the gas phase polymerization system comprises sensing the pressure in the reactor and when the pressure exceeds a pre-determined value additional carrier gas needs to be removed from the gas phase polymerization system.

17. The process of claim 16, wherein the pre-determined value is 2,000 kPa-absolute.

18. The process of claim 16, wherein the pre-determined value is 1,800 kPa-absolute.

19. The process of claim 1, wherein the stripping medium contacted with the first portion of the reactor overhead within the vent column comprises condensed hydrocarbons separated from the polymer product within the product purge bin.

20. The process of claim 1, wherein during steps (1), (2), (3), (4), and (5) each lock hopper is isolated by closed valves from any of the reactor, the other lock hoppers and the product discharge system not necessary for the performance of the respective step.

* * * * *